United States Patent
Li et al.

(10) Patent No.: US 9,803,079 B2
(45) Date of Patent: Oct. 31, 2017

(54) METHOD OF PREPARING FIBER-REINFORCED POLYMER COMPOSITES AND FIBER-REINFORCED POLYMER COMPOSITES PREPARED THEREOF

(71) Applicant: AGENCY FOR SCIENCE, TECHNOLOGY AND RESEARCH, Singapore (SG)

(72) Inventors: Xu Li, Singapore (SG); Chao Bin He, Singapore (SG); Haiwen Gu, Singapore (SG); Siew Yee Wong, Singapore (SG); Shilin Chen, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/653,846

(22) PCT Filed: Dec. 18, 2013

(86) PCT No.: PCT/SG2013/000541
§ 371 (c)(1),
(2) Date: Jun. 18, 2015

(87) PCT Pub. No.: WO2014/098772
PCT Pub. Date: Jun. 26, 2014

(65) Prior Publication Data
US 2015/0368410 A1   Dec. 24, 2015

(30) Foreign Application Priority Data

Dec. 18, 2012 (SG) ................ 201209333-2

(51) Int. Cl.
| C08L 63/00 | (2006.01) |
| C01B 33/44 | (2006.01) |
| C08K 9/06 | (2006.01) |
| C08J 5/10 | (2006.01) |
| C08K 7/14 | (2006.01) |
| C08J 3/00 | (2006.01) |
| C08L 77/02 | (2006.01) |
| C08J 5/08 | (2006.01) |
| C08J 3/20 | (2006.01) |

(52) U.S. Cl.
CPC ............ *C08L 63/00* (2013.01); *C01B 33/44* (2013.01); *C08J 3/005* (2013.01); *C08J 5/10* (2013.01); *C08K 7/14* (2013.01); *C08K 9/06* (2013.01); *C08L 77/02* (2013.01); *C08J 3/203* (2013.01); *C08J 5/08* (2013.01); *C08J 2363/00* (2013.01); *C08J 2377/02* (2013.01); *C08L 2314/00* (2013.01)

(58) Field of Classification Search
None
See application file for complete search history.

(56) References Cited

U.S. PATENT DOCUMENTS

| 5,385,776 A * | 1/1995 | Maxfield ................. C08K 7/00 428/297.4 |
| 5,760,121 A * | 6/1998 | Beall ....................... A61K 8/26 524/445 |
| 6,271,297 B1 * | 8/2001 | Ishida .................... B82Y 30/00 523/223 |
| 2002/0137834 A1 | 9/2002 | Barbee et al. |
| 2010/0040653 A1 * | 2/2010 | Grah ....................... C08K 9/04 424/401 |
| 2010/0196611 A1 | 8/2010 | Phonthammachai et al. |
| 2010/0324195 A1 * | 12/2010 | Williamson .......... B82Y 30/00 524/445 |
| 2013/0186294 A1 * | 7/2013 | Davies ................... F42B 5/307 102/467 |
| 2014/0221537 A1 * | 8/2014 | Youn ...................... C08K 3/346 524/100 |

FOREIGN PATENT DOCUMENTS

| JP | 2009-035593 A | * | 2/2009 |
| WO | WO 99/41299 | * | 8/1999 |
| WO | WO 99/41299 A1 | | 8/1999 |
| WO | WO 99/54393 A1 | | 10/1999 |

OTHER PUBLICATIONS

PCT Notification of Transmittal of the International Search Report and the Written Opinion of the International Searching Authority, or the Declaration for PCT Counterpart Application No. PCT/SG2013/000541, 11 pgs., dated (Feb. 17, 2014).

PCT International Preliminary Report on Patentability (Chapter II of the Patent Cooperation Treaty) for PCT Counterpart Application No. PCT/SG2013/000541, 16 pgs., dated (Nov. 24, 2014).

* cited by examiner

*Primary Examiner* — Marc Zimmer
(74) *Attorney, Agent, or Firm* — Blakely, Sokoloff, Taylor & Zafman LLP

(57) ABSTRACT

A method of preparing a fiber-reinforced polymer composite is provided. The method includes (a) providing a swollen clay material; (b) chemically modifying a surface of the swollen clay material with an organosilane to form a silane-modified clay material; (c) intercalating the silane-modified clay material with a binder to form an intercalated clay material; and (d) melt compounding the intercalated clay material with a mixture comprising a polymer and fiber to form the fiber-reinforced polymer composite. A fiber-reinforced polymer composite is also provided.

12 Claims, 24 Drawing Sheets

A)

B)

(C)

Epoxy intercalation    Polymer intercalation

A)

B)

C)

D)

(A)

(B)

(C)

(D)

(E)

(A)

(B)

(C)

(D)

(A)

(B)

(C)

(D)

(E)

(A)

(B)

(C)

(A)

(B)

(A)

(B)

(C)

(A)

(B)

US 9,803,079 B2

METHOD OF PREPARING FIBER-REINFORCED POLYMER COMPOSITES AND FIBER-REINFORCED POLYMER COMPOSITES PREPARED THEREOF

CROSS-REFERENCE TO RELATED APPLICATIONS

This patent application is a U.S. National Phase Application under 35 U.S.C. §371 of International Application No. PCT/SG2013/000541, filed on 18 Dec. 2013, entitled METHOD OF PREPARING FIBER-REINFORCED POLYMER COMPOSITES AND FIBER-REINFORCED POLYMER COMPOSITES PREPARED THEREOF, which claims the benefit of priority of Singapore patent application No. 201209333-2, filed on 18 Dec. 2012, the content of which was incorporated by reference in its entirety for all purposes.

TECHNICAL FIELD

The invention relates to polymer composites. In particular, the invention relates to fiber-reinforced polymer composites.

BACKGROUND

Short glass-fiber-reinforced polymer composites are widely used in the automobile industry to replace some heavy metallic parts due to their lightweight, processibility, low-cost and ability to tailor their properties for different applications. However, high loadings of the glass-fibers which are used to impart great strength and stiffness to these composites result in reduced fracture toughness, thus limiting their use to only non-impact or low-impact applications.

One technique to improve fracture toughness or impact resistance of short glass-fiber-reinforced polymer composites is through chemical modification of polyamide. This suffers from drawbacks due to complexity of the chemical reactions involved.

In view of the above, there exists a need for an improved method to prepare fiber-reinforced polymer composites that addresses one or more of the above-mentioned problems.

SUMMARY

In a first aspect, the invention relates to a method of preparing a fiber-reinforced polymer composite. The method comprises
 (a) providing a swollen clay material;
 (b) chemically modifying a surface of the swollen clay material with an organosilane to form a silane-modified clay material;
 (c) intercalating the silane-modified clay material with a binder to form an intercalated clay material; and
 (d) melt compounding the intercalated clay material with a mixture comprising a polymer and fiber to form the fiber-reinforced polymer composite.

In a second aspect, the invention relates to a fiber-reinforced polymer composite prepared by a method according to the first aspect.

In a third aspect, the invention relates to a fiber-reinforced polymer composite comprising a silane-modified clay material that is intercalated with a binder.

BRIEF DESCRIPTION OF THE DRAWINGS

The invention will be better understood with reference to the detailed description when considered in conjunction with the non-limiting examples and the accompanying drawings, in which:

FIG. 2A to 2D are graphs showing tensile properties of polyamide 6/glass-fiber/clay ternary composite at different clay content, of which:

FIG. 2A is a graph showing Young's. Modulus (GPa) of polyamide 6/glass-fiber/clay ternary composite at different clay content of i) 0 wt %; ii) 2 wt %; iii) 3 wt %; iv) 4 wt %; and v) 5 wt % clay. From the figure, it may be seen that there is increased Young's modulus of about 40%.

FIG. 2B is a graph showing tensile stress (MPa) of polyamide 6/glass-fiber/clay ternary composite at different clay content of i) 0 wt %; ii) 2 wt %; iii) 3 wt %; iv) 4 wt %; and v) 5 wt % clay. From the figure, it may be seen that there is increased tensile strength of about 24%. The increased Young's modulus and tensile strength indicate that the introduction of modified clay increases the strength of polyamide/glass fiber (PA6/GF).

FIG. 2C is a graph showing failure strain (%) of polyamide 6/glass-fiber/clay ternary composite at different clay content of i) 0 wt %; ii) 2 wt %; iii) 3 wt %; iv) 4 wt %; and v) 5 wt % clay.

FIG. 2D is a graph showing strain energy at failure (MJ/m$^3$) of polyamide 6/glass-fiber/clay ternary composite at different clay content of i) 0 wt %; ii) 2 wt %; iii) 3 wt %; iv) 4 wt %; and v) 5 wt % clay. The significantly enhanced failure tensile strain means an improved ductility of about 40% was obtained.

FIG. 4B is an expanded view of the area highlighted in FIG. 4A. Scale bar in FIG. 4A denotes 1 μm. Scale bar in FIG. 4B denotes 0.5

μm. The intercalated structure of clay sheets in ternary composites is confirmed by the observation of composite cross-section.

Figure 5:
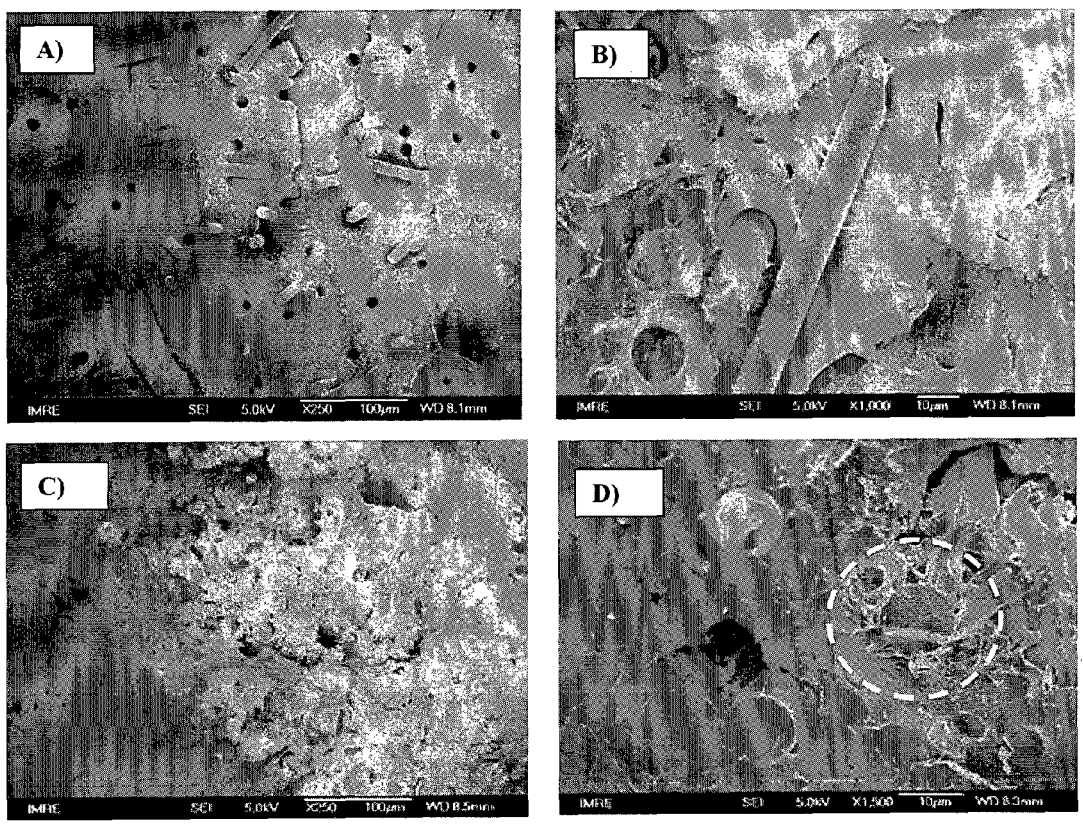

FIG. 5A to 5D are scanning electron microscopy (SEM) images of cross-section of test bars of glass fiber-reinforced Polyamide 6 (FIGS. 5A and 5B) and Polyamide 6/glass-fiber/clay ternary composite (FIGS. 5C and 5D, clay: 3 wt %, glass fiber: 15 wt %). Highlighted area by dashed circle (in FIG. 5D) demonstrates residual partial bonding between polyamide 6 and glass fiber after tension failure. SEM images of the cross section of broken tensile specimen bar of composites demonstrate the different polyamide/glass-fiber interfacial interaction. Significant increase in interfacial interaction between polyamide and glass fiber may be observed from the SEM images, where a thick polyamide layer is wrapped at the surface of glass fiber. Scale bar in FIG. 5A and FIG. 5C denotes 100 μm. Scale bar in FIG. 5B and FIG. 5D denotes 10 μm.

Figure 6:
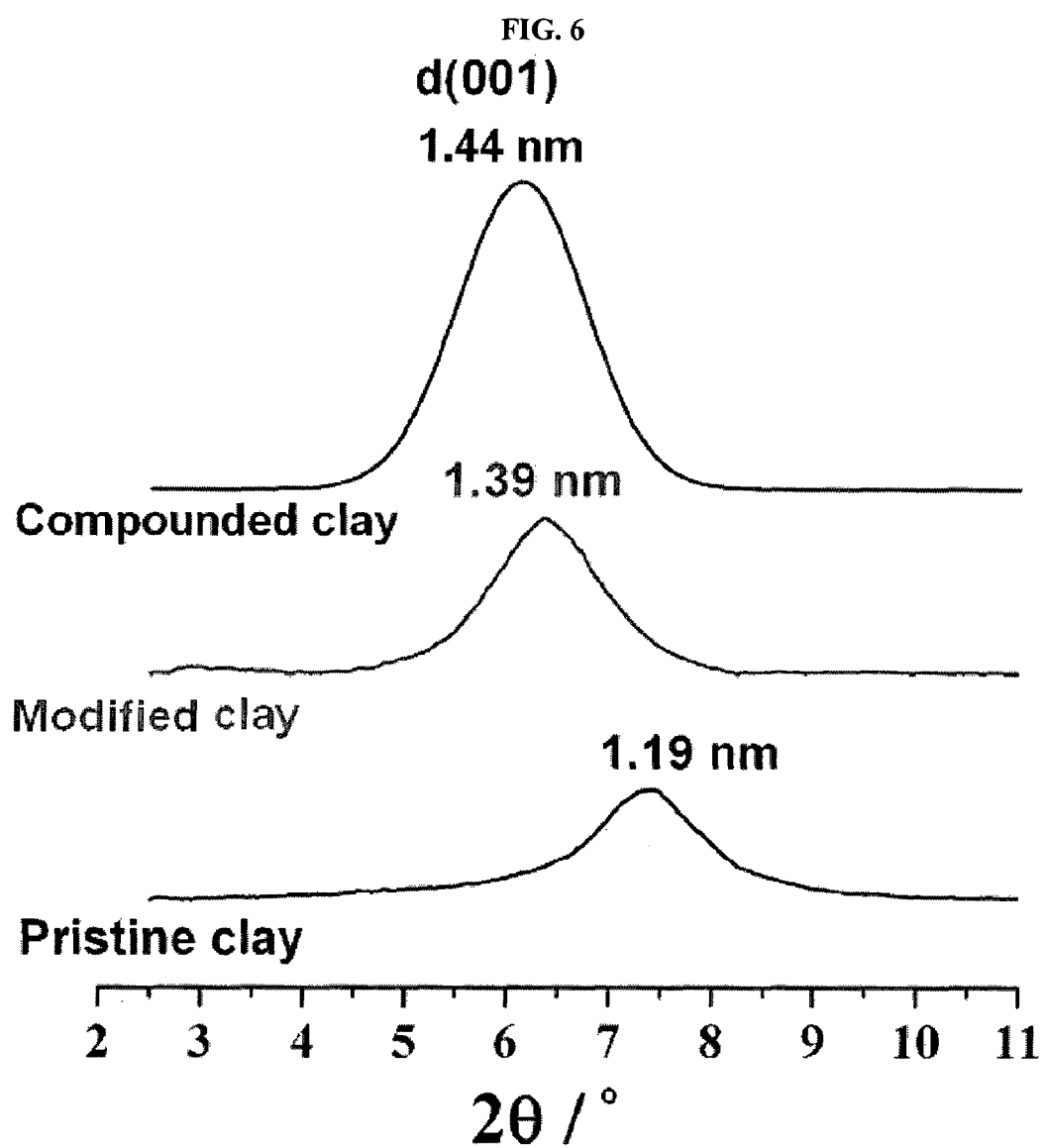

FIG. 6 is a graph depicting X-ray powder diffraction (XRD) spectra of pristine clay, modified clay (after modification and intercalation), and compounded clay (after melt compounding with polyamide 6 and glass fiber at clay content of 3 wt %). The XRD analysis demonstrates that the d-spacing of clay sheets increase from 1.19 to 1.39 nm after intercalated by epoxy resin, and further increase from 1.39 to 1.44 nm after compounding with polyamide which is due to the intercalation of polyamide.

Figure 7:
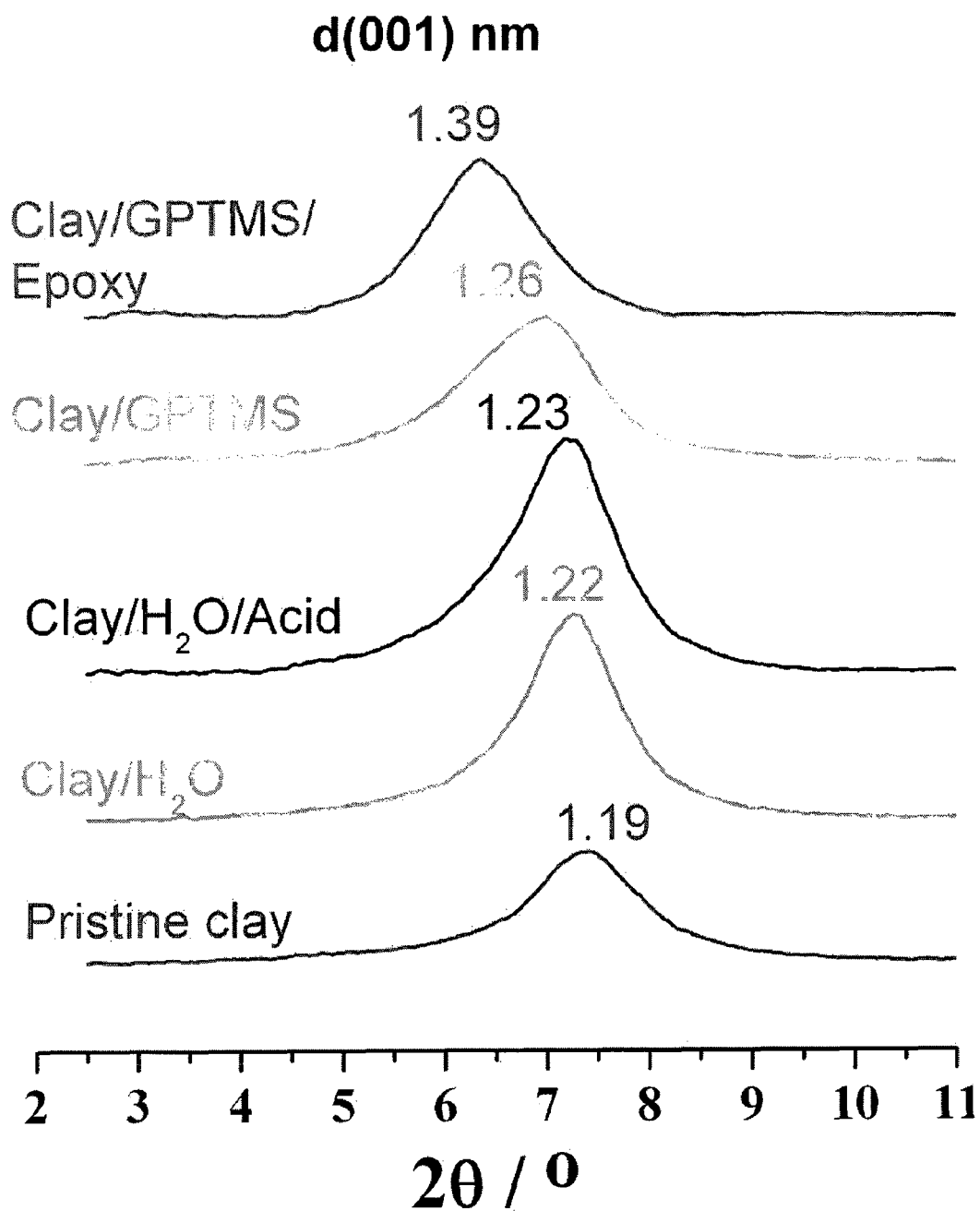
Figure 8:
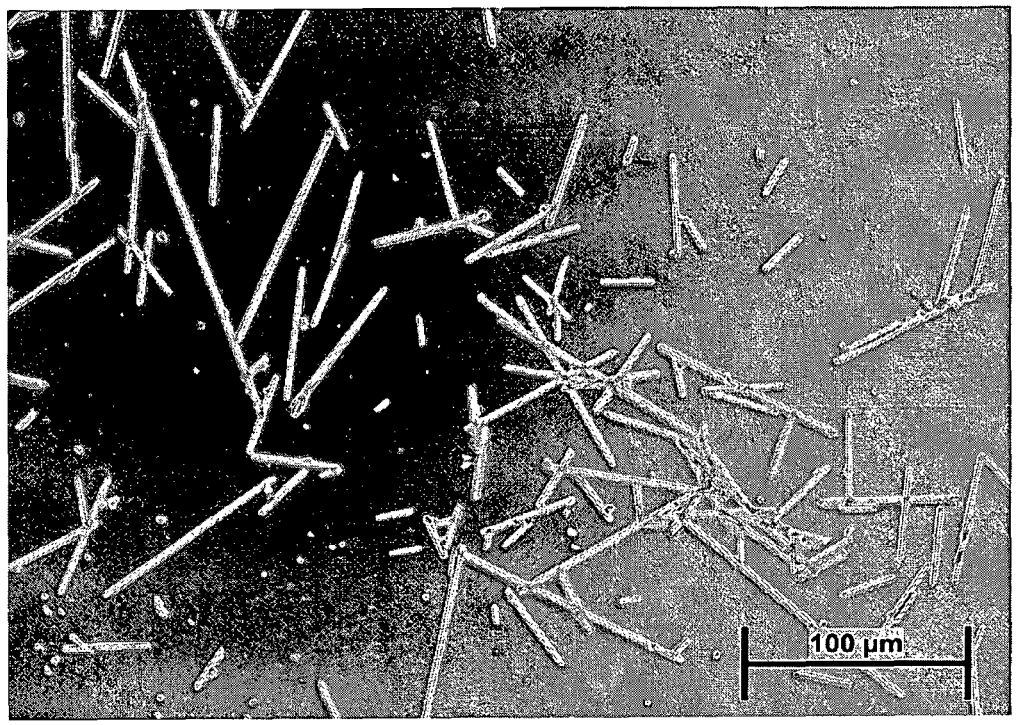
Figure 8:
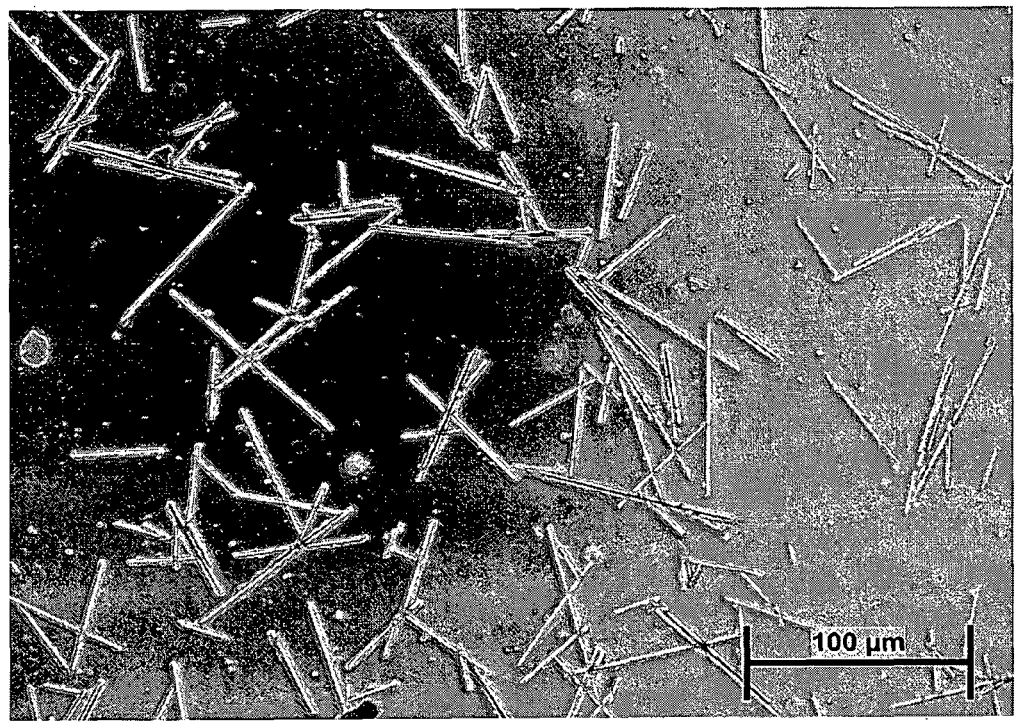
Figure 8:
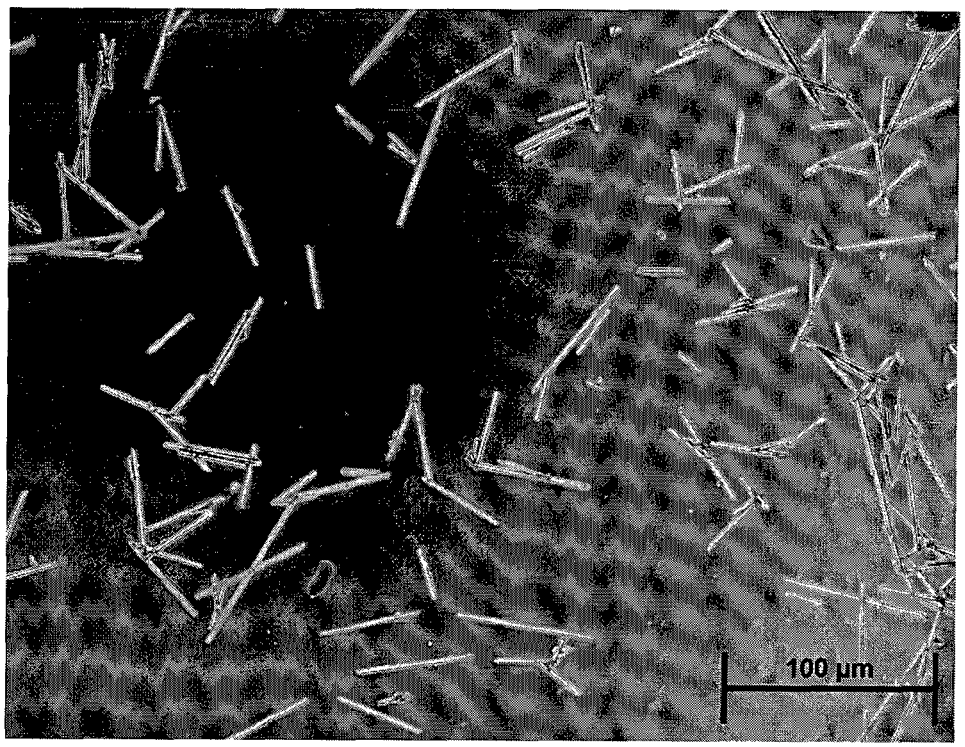
Figure 8:
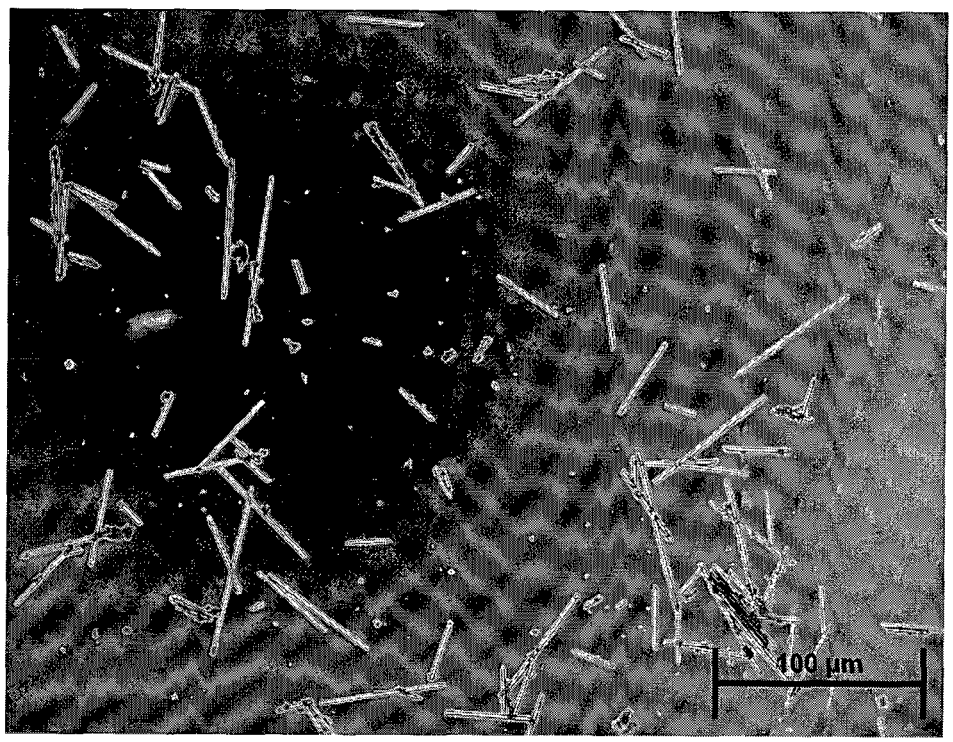
Figure 8:
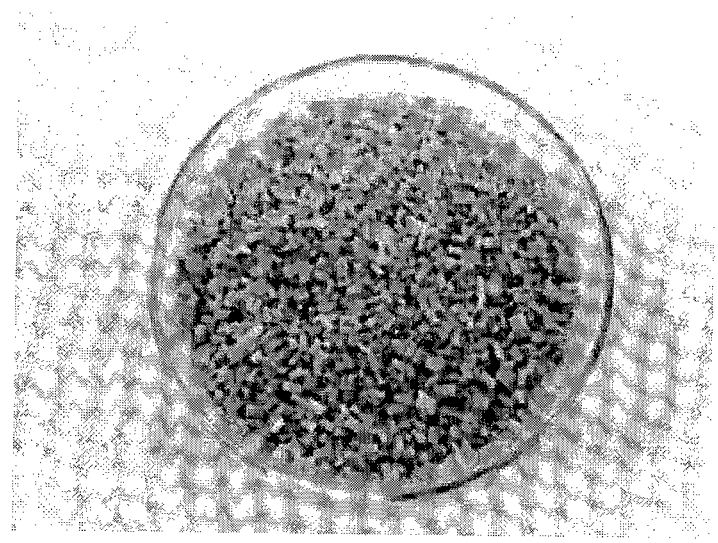

FIG. 7 is a graph depicting X-ray powder diffraction (XRD) spectra of Clay/3-glycidoxypropyltrimethoxysilane (GPTMS)/Epoxy, Clay/GPTMS, Clay/$H_2O$/Acid, Clay/$H_2O$, and pristine clay with d-spacing values at 1.39, 1.26, 1.23, 1.22 and 1.19 respectively. For Clay/GPTMS/Epoxy, clay is modified by GPTMS and then intercalated by epoxy. For Clay/GPTMS, clay is modified by GPTMS. For Clay/$H_2O$/Acid, clay is swollen by water and treated in dilute acid solution. For Clay/$H_2O$, clay is swollen by water. Pristine clay is raw MMT clay without any modification. The XRD analysis demonstrates that the d-spacing of clay sheets increase slightly from 1.19 to 1.26 nm after treated with water, acid and GPTMS, and further increase from 1.26 to 1.39 nm after intercalated by epoxy resin.

FIG. 8A to 8D are optical microscope photographs of glass fiber extracted from PA6 composites compounded at different processing conditions, which are (A) Raw PA6/GF; (B) Extrusion, L/D=27, 250-255° C., 200 RPM; (C) Melt mixing, 220° C./10 min, 100 RPM; and (D) Extrusion, L/D=40, 250-255° C., 200 RPM. FIG. 8E is a photograph of PA6/glass-fiber/clay ternary composite pellets which shows a light color appearance. Scale bar in the figures denote a length of 100 μm.

Figure 9:
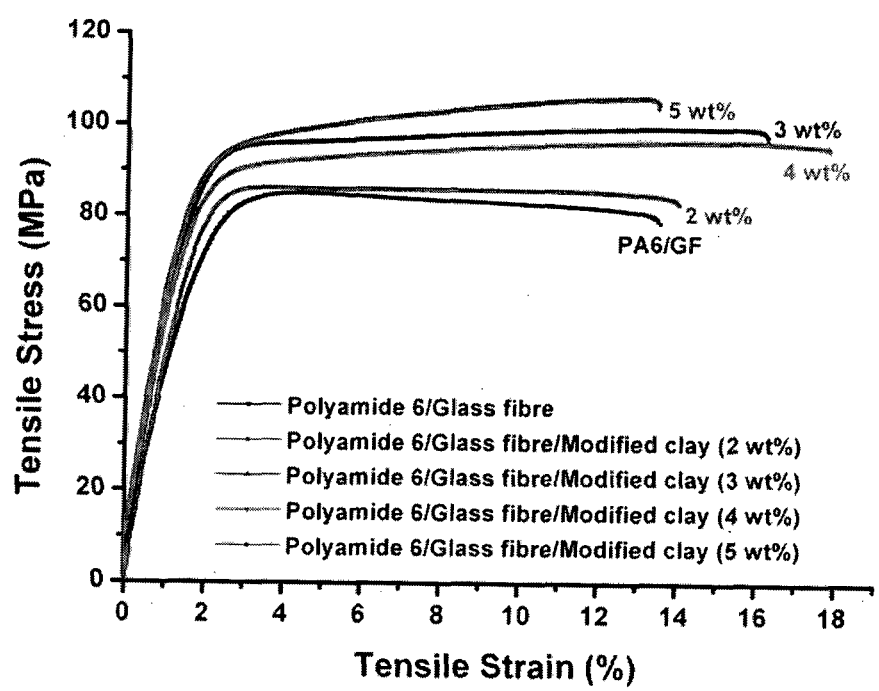

FIG. 9 is a graph showing typical stress-strain curves (2 mm/min) performed using ASTM D638-03 for a) PA6/Glass Fiber (PA6/GF), 0 wt % clay; b) PA6/Glass Fiber/Clay (2 wt %); c) PA6/Glass Fiber/Clay (3 wt %); d) PA6/Glass Fiber/Clay (4 wt %); and e) PA6/Glass Fiber/Clay (5 wt %).

Figure 10:
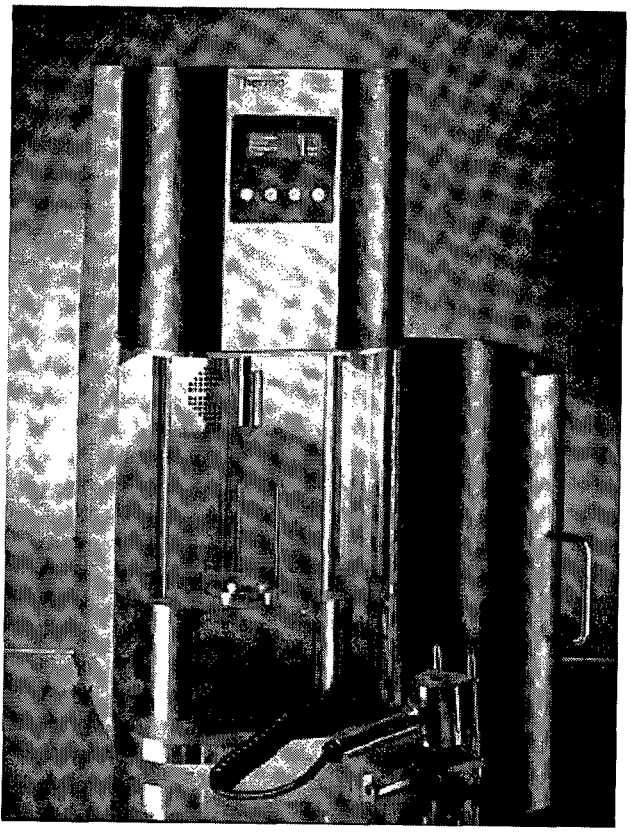

FIG. 10 is a photograph showing a Haake MiniJet piston injection molding system used in various embodiments (Barrel T: 260-280° C.; Mold T: 80-100° C.).

Figure 11:
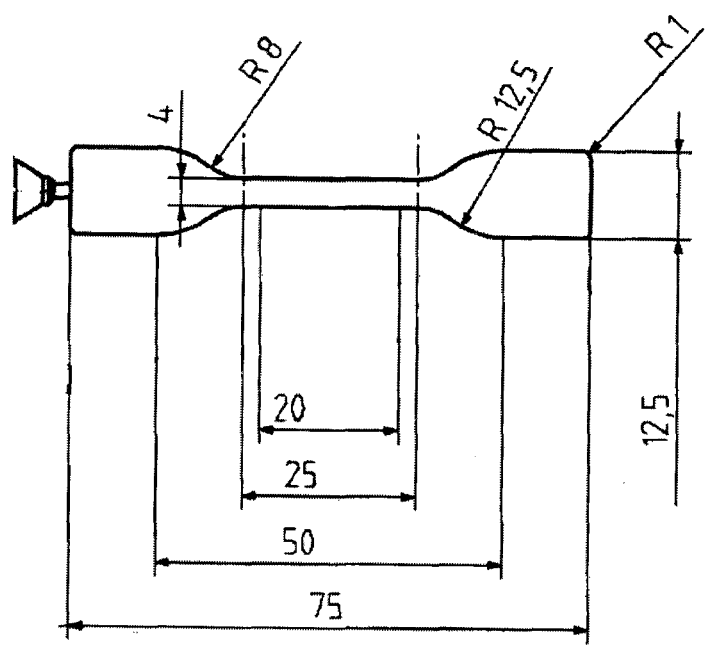

FIG. 11 is a tensile bar according to ISO 527-2-5A.

Figure 12:
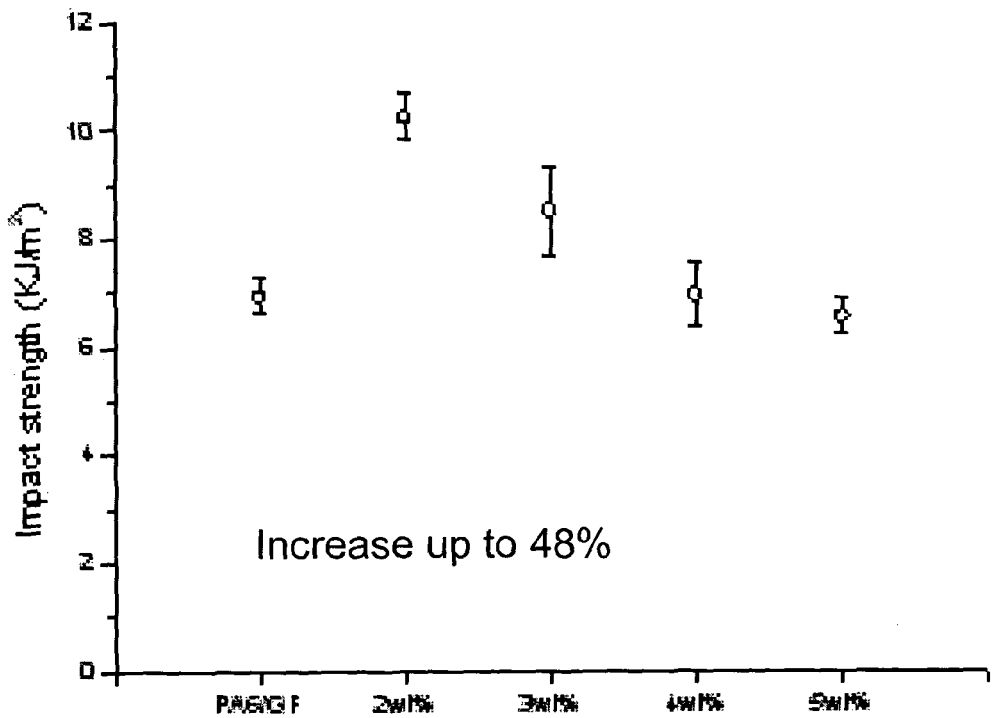

FIG. 12 is a graph showing Izod impact strength of PA6/glass fiber/clay ternary composites according to various embodiments. The test was carried out following Notch Izod impact standard test, method (ASTM D256). Y-axis: impact strength ($KJ/m^2$); x-axis: a) PA6/Glass Fiber (PA6/GF), 0 wt % clay; b) PA6/Glass Fiber/Clay (2 wt %);. c) PA6/Glass Fiber/Clay (3 wt %); d) PA6/Glass Fiber/Clay (4 wt %); and e) PA6/Glass Fiber/Clay (5 wt %). Results indicated that there is an increase in impact strength of up to 48% compared to neat PA6/Glass Fiber.

Figure 13:
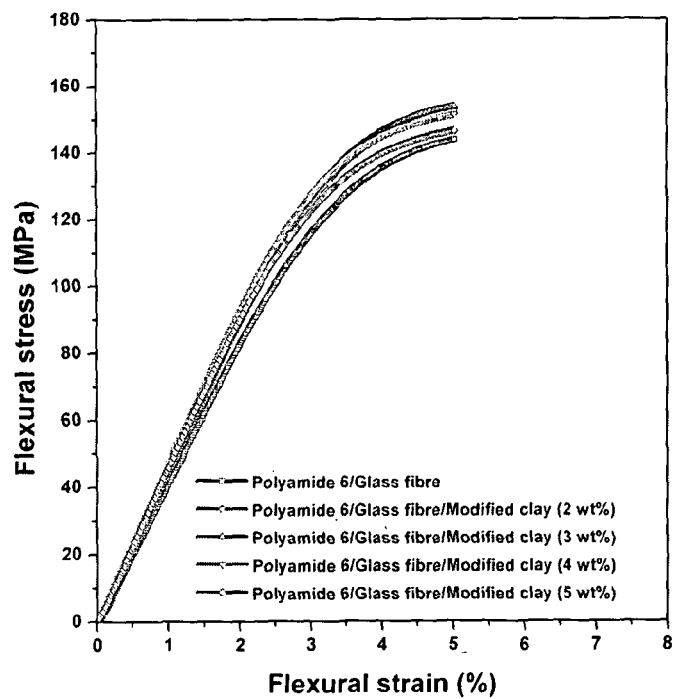

FIG. 13 is a graph showing typical flexural stress-flexural strain curves for a) PA6/Glass Fiber (PA6/GF), 0 wt % clay; b) PA6/Glass Fiber/Clay (2 wt %); c) PA6/Glass Fiber/Clay (3 wt %); d) PA6/Glass Fiber/Clay (4 wt %); and e) PA6/Glass Fiber/Clay (5 wt %). Measurements were conducted using standard test method ASTM D790-03. Y-axis: flexural stress (MPa); x-axis: flexural strain (%).

Figure 14:
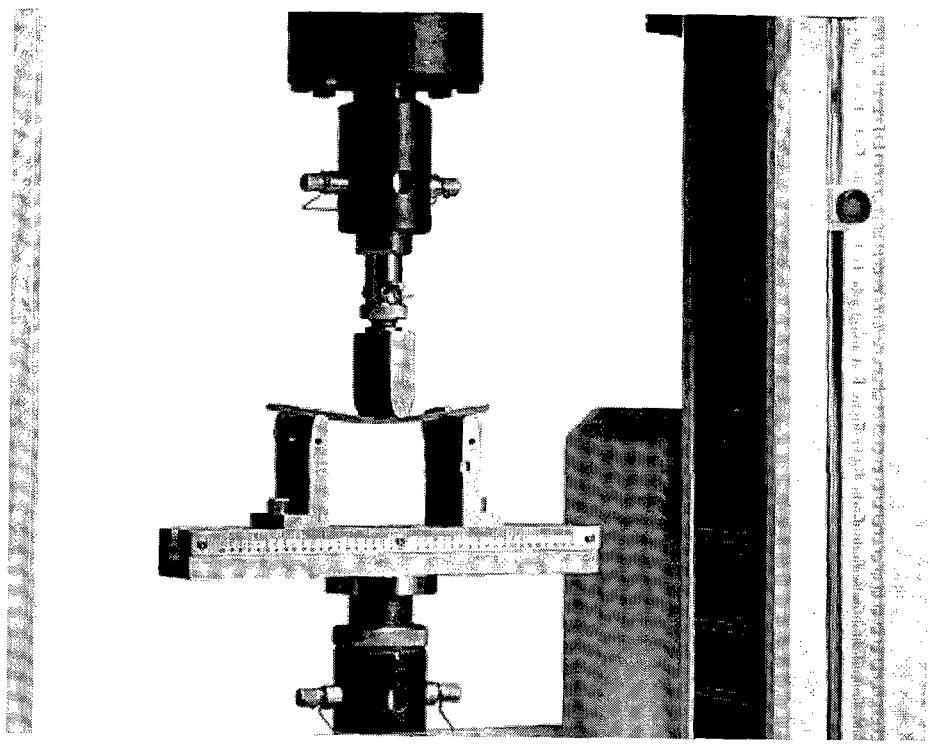

FIG. 14 is a photograph showing a 3-point bending tester used (Instron 5569).

Figure 15:
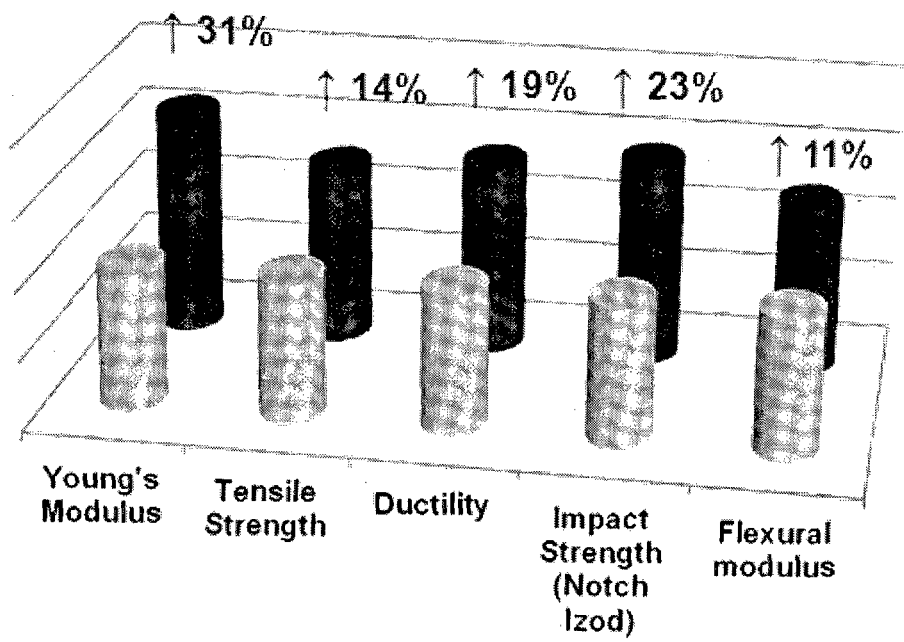

FIG. 15 is a graph comparing mechanical performance between composites disclosed herein and convention glass fiber polymers (GFP). Results indicated that improvements in Young's modulus, tensile strength, ductility, impact strength (Notch Izod) and flexural modules of 31%, 14%, 19%, 23% and 11% respectively, have been obtained.

Figure 16:
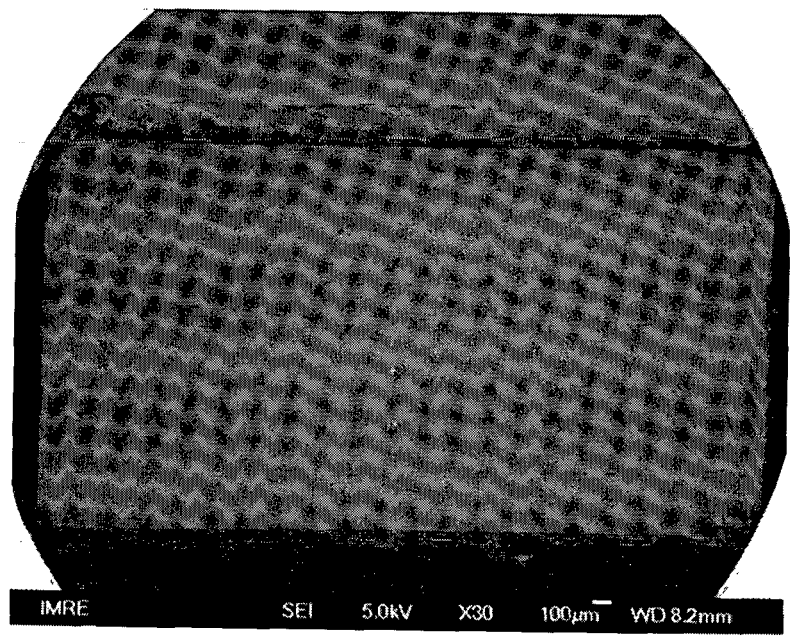
Figure 16:
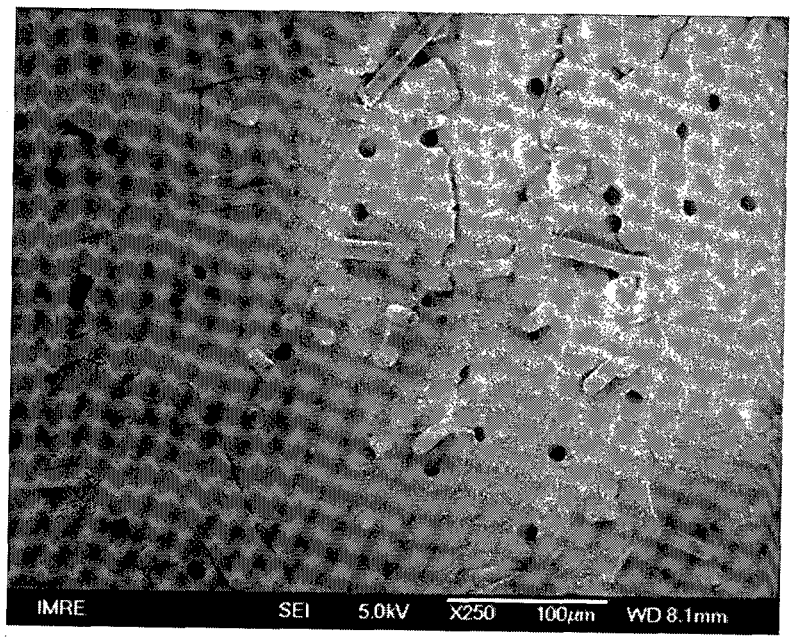
Figure 16:
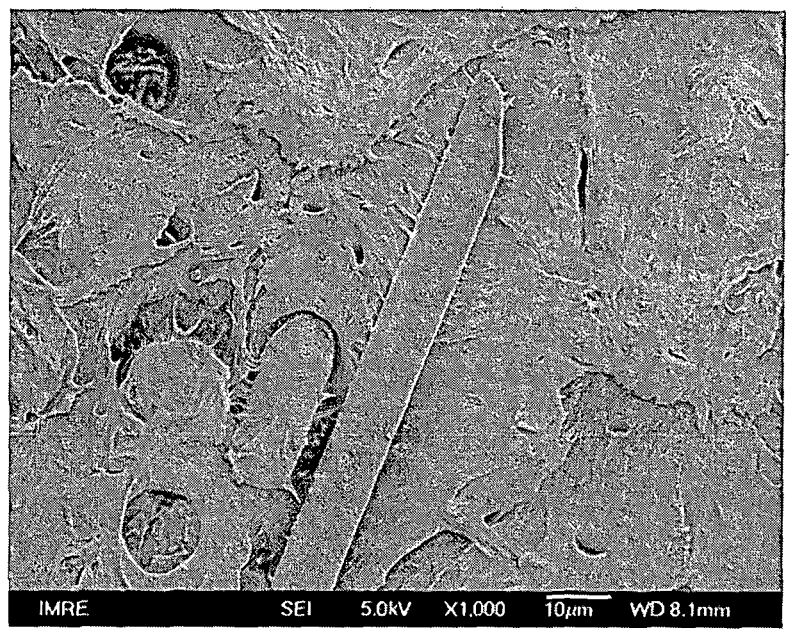
Figure 16:
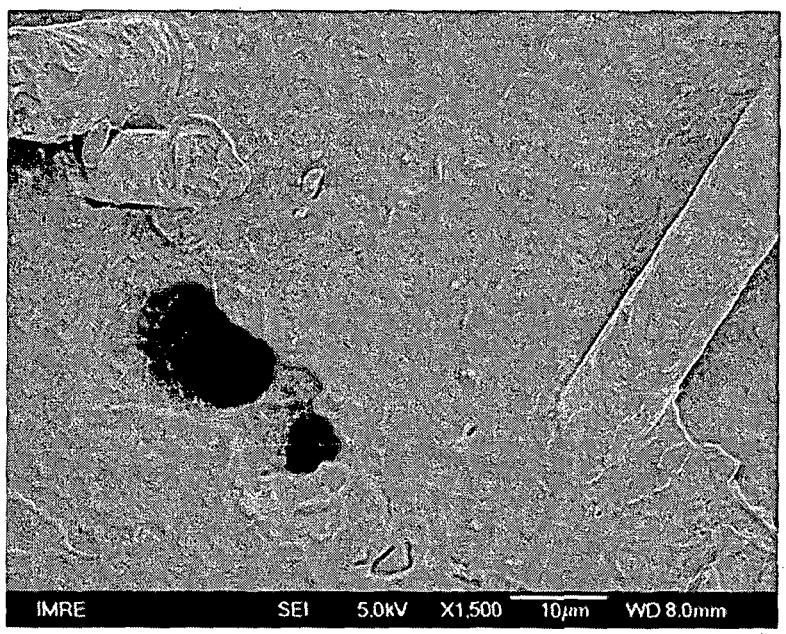

FIG. 16A to 16D are scanning electron microscopy (SEM) images showing cross-section morphology of tensile test bars of glass fiber-reinforced Polyamide 6 (glass fiber: 15 wt %). Smooth fracture surface in FIGS. 16A and 16B is indicative of brittle failure under tension. Further, glass fibers are pulled out or elongated in length with smooth surface, as shown in FIGS. 16C and 16D, which is indicative of weak interfacial bonding. This in turn means that the neat PA6/glass fiber composite has low strength and bad ductility. Scale bar in FIGS. 16A and 16B denotes a length of 100 μm; scale bar in FIGS. 16C and 16D denotes a length of 10 μm.

Figure 17:
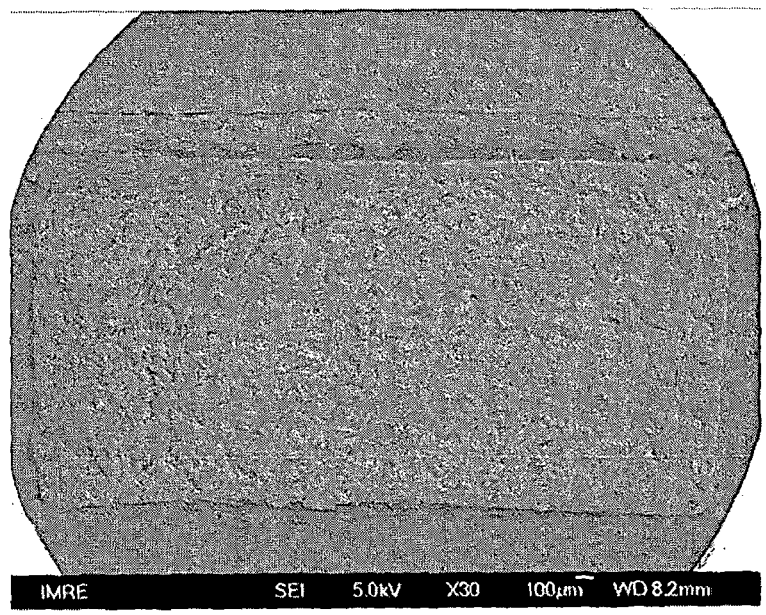
Figure 17:
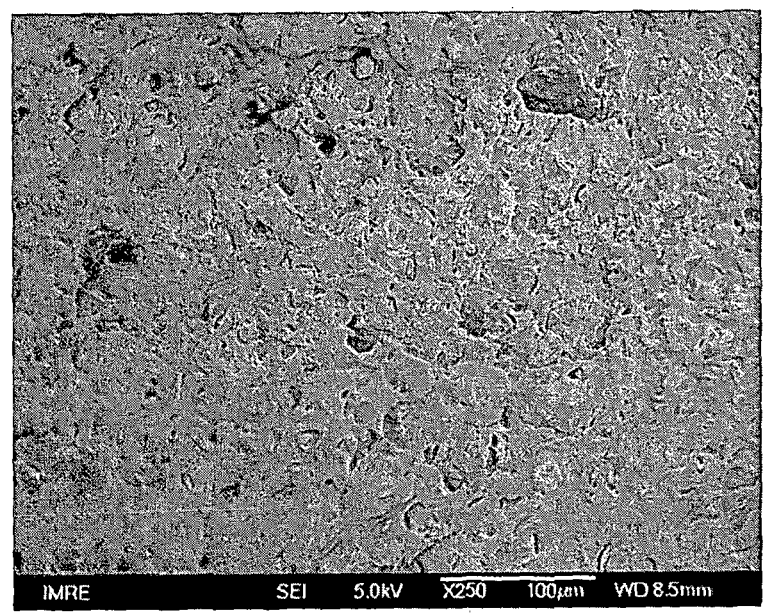
Figure 17:
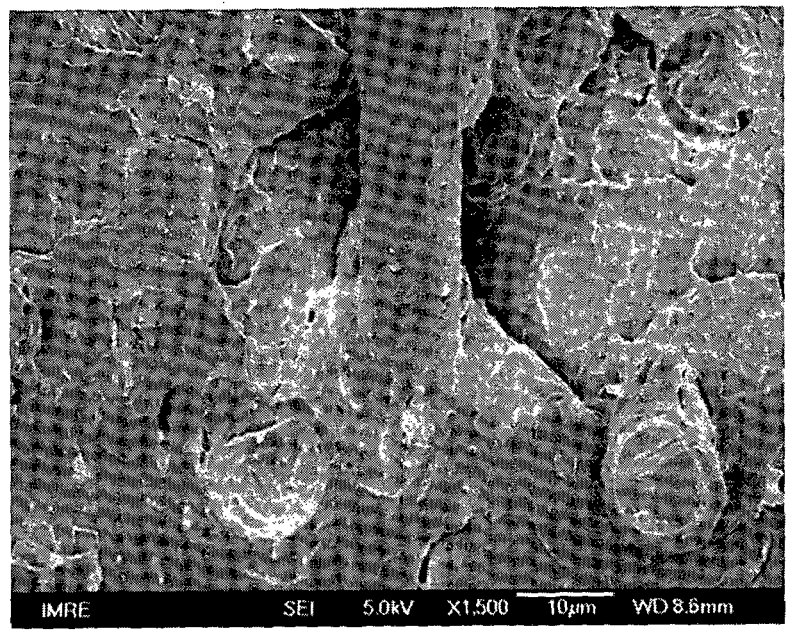
Figure 17:
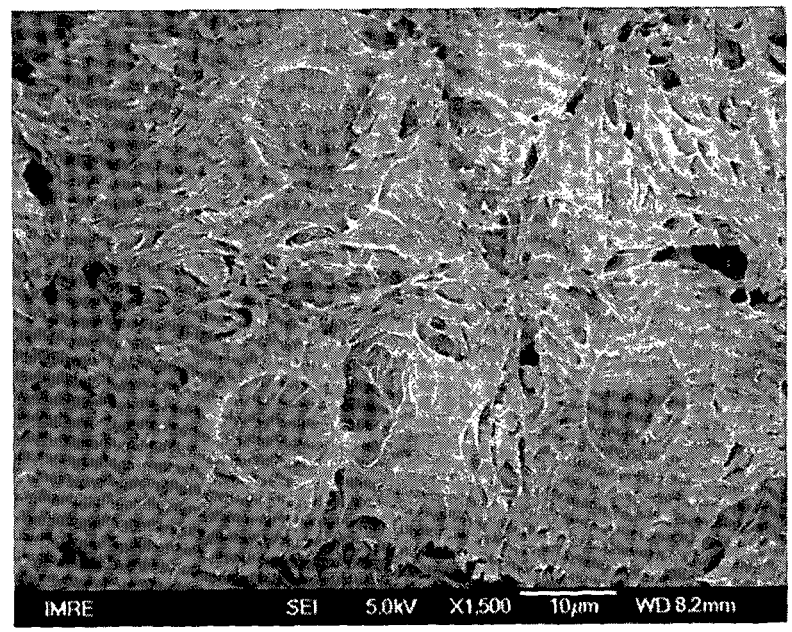
Figure 17:
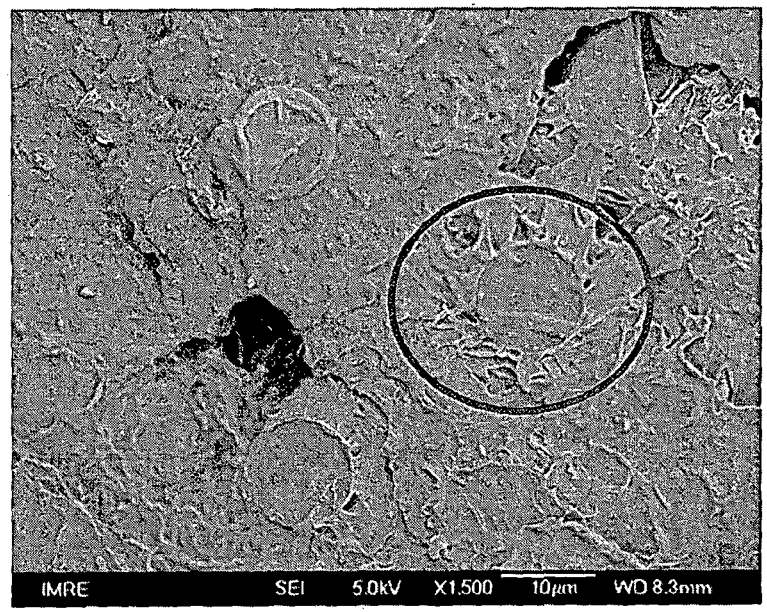

FIG. 17A to 17E are scanning electron microscopy (SEM) images showing cross-section morphology of tensile test bars for PA6/glass fiber/clay (clay: 3 wt %; glass fiber: 15 wt %) composites. The images show much rougher surface morphology (FIG. 17A and 17B). FIG. 17C and 17D show that few glass fibers are pulled out or separated from the PA6/clay matrix. PA6 is thickly coated on glass fiber, and there is co-break of PA6 and GF. The images show there is strong interfacial bonding between GF and PA6. This in turn means that the PA6/glass fiber/clay (3 wt %) composite has high strength and low ductility. Scale bar in FIGS. 17A and 17B denotes a length of 100 μm; scale bar in FIG. 17C to 17E denotes a length of 10 μm.

Figure 18:
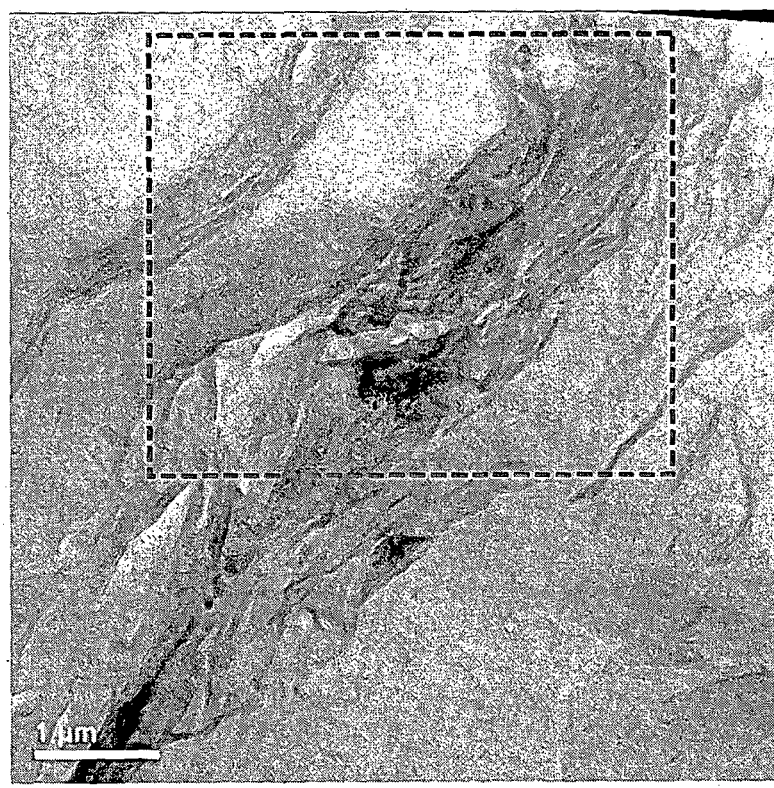
Figure 18:
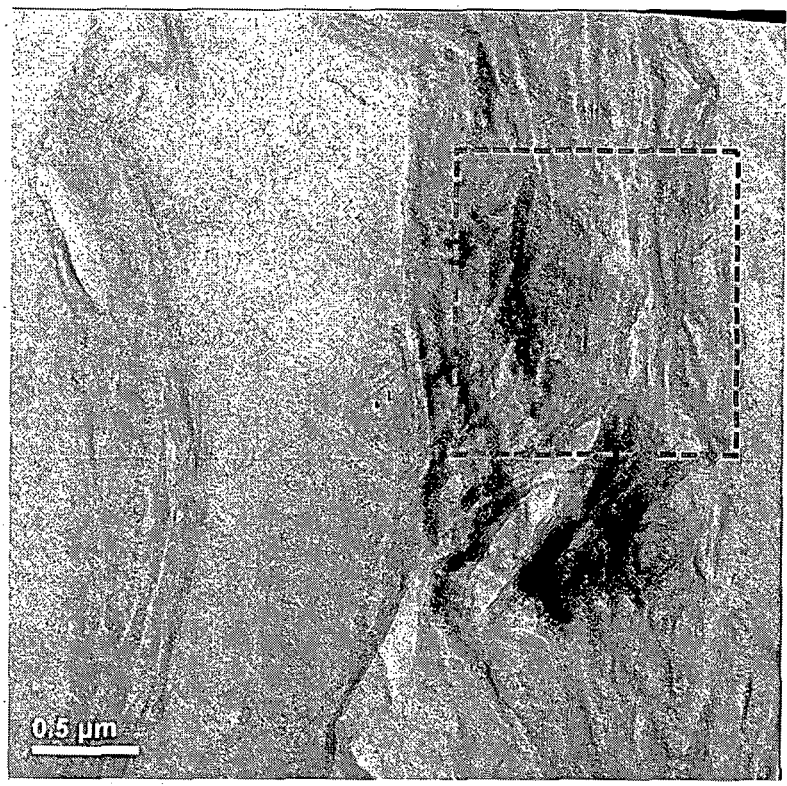
Figure 18:
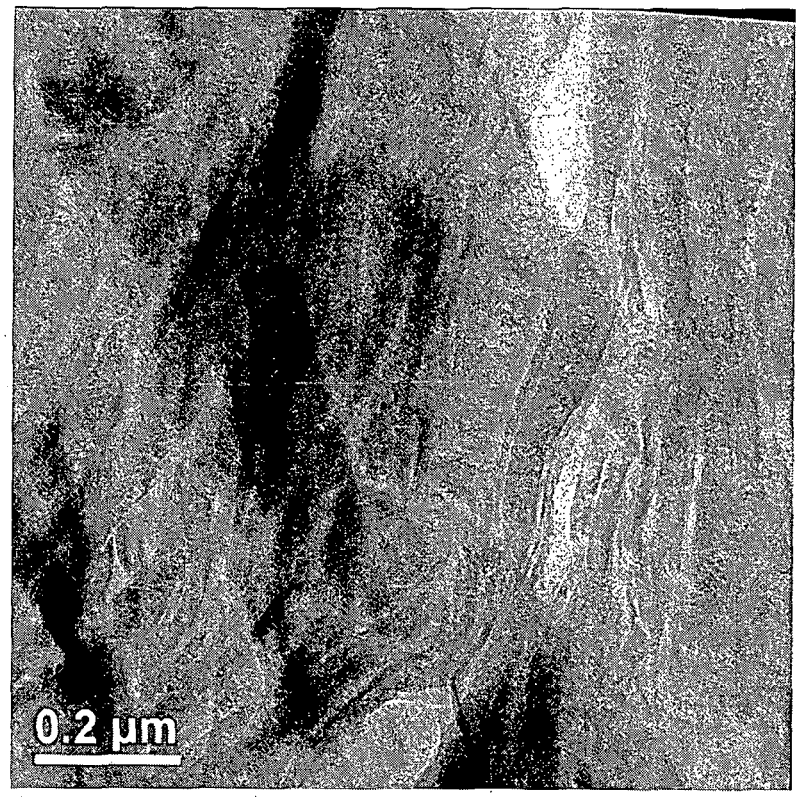

FIG. 18A to 18C are transmission electron microscopy (TEM) images for PA6/glass fiber/clay (3 wt %) (PA6/GF/ Clay (3 wt %)) composites. FIG. 18B is an expanded view of the highlighted area in FIG. 18A. FIG. 18C is an expanded view of the highlighted area in FIG. 18B. Images show intercalated clay in PA6/GF/clay ternary composites. The scale bar in FIG. 18A denotes a length of 1 μm; FIG. 18B denotes a length of 0.5 μm; and FIG. 18C denotes a length of 0.2 μm.

Figure 19:
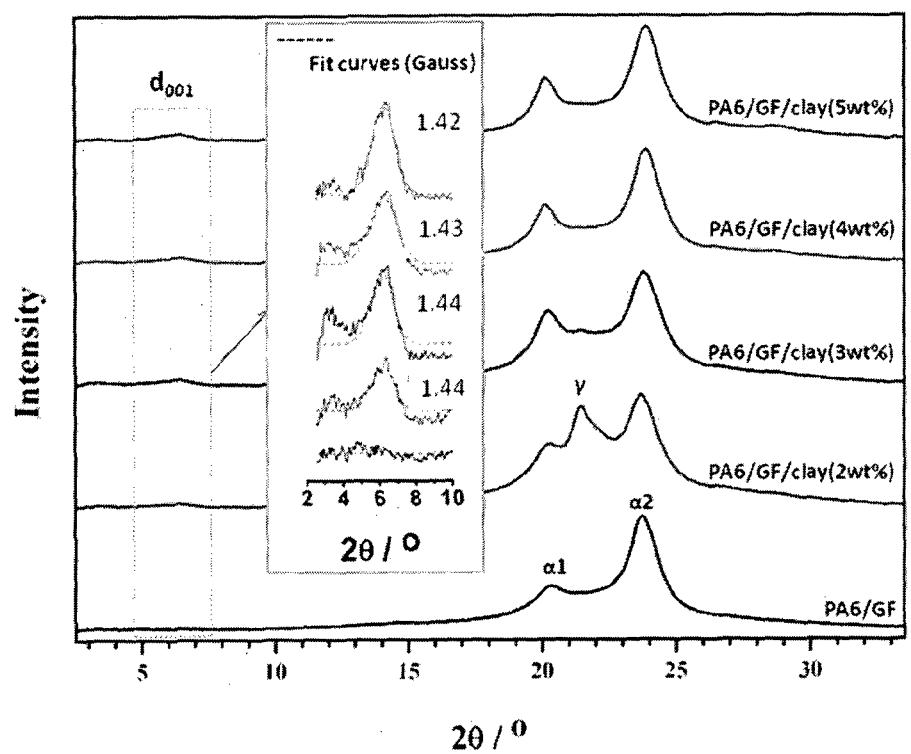
Figure 19:
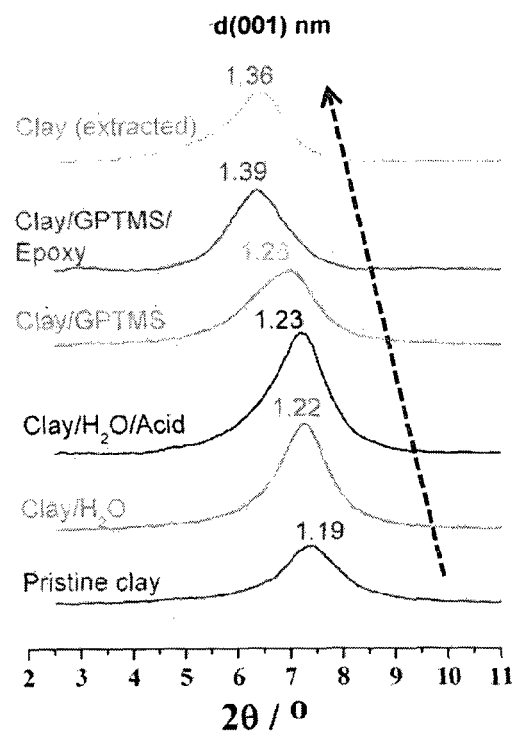

FIG. 19A is a graph depicting X-ray diffraction (XRD) spectra of PA6/Glass Fiber/Clay ternary composites for a) PA6/Glass Fiber (PA6/GF) (0 wt % clay); b) PA6/Glass Fiber/Clay (2 wt %); c) PA6/Glass Fiber/Clay (3 wt %); d) PA6/Glass Fiber/Clay (4 wt %); and e) PA6/Glass Fiber/ Clay (5 wt %). FIG. 19B is an expanded view of the area highlighted in FIG. 19A. Clay was intercalated by both epoxy and polyamide 6. d-spacing of clay increased 0.20 nm by addition of epoxy, and d-spacing of clay increased 0.25 nm after compounding.

Figure 20:
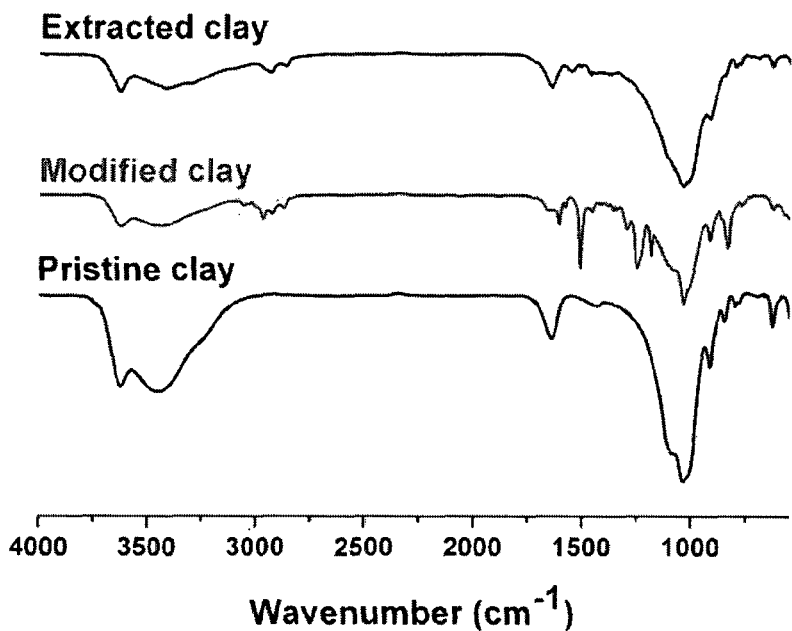

FIG. 20 is a graph showing Fourier transform infrared (FTIR) spectra of extracted clay, modified clay and pristine clay. Results indicate intercalation of clay with epoxy, and that there is covalent bonding formed during melt blending. About 15 wt % of PA6 is bonded with clay extracted from composites.

Figure 21:
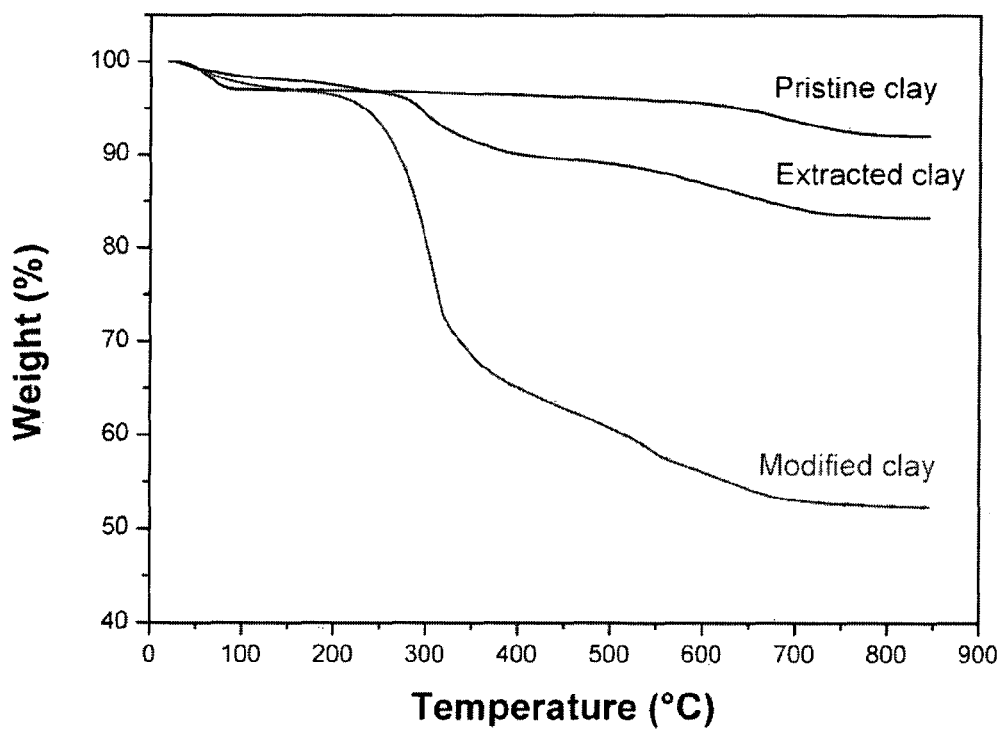

FIG. 21 is a graph showing thermogravimetric analysis (TGA) spectra of extracted clay, modified clay and pristine clay. Y-axis: weight (%); x-axis: temperature (° C.). Results indicate intercalation of clay with epoxy, and that there is covalent bonding formed during melt blending. About 15 wt % of PA6 is bonded with clay extracted from composites.

Figure 22:
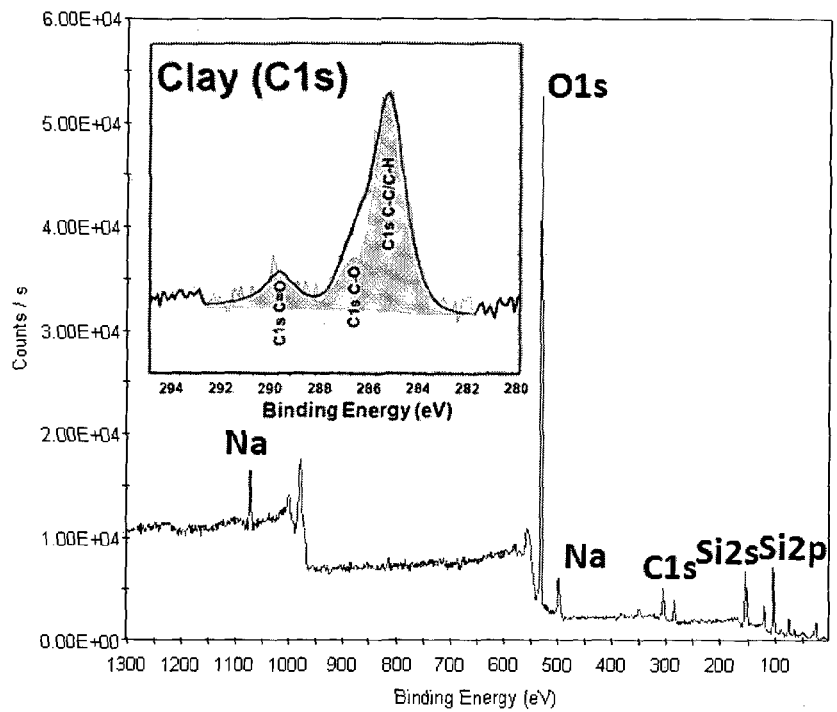
Figure 22:
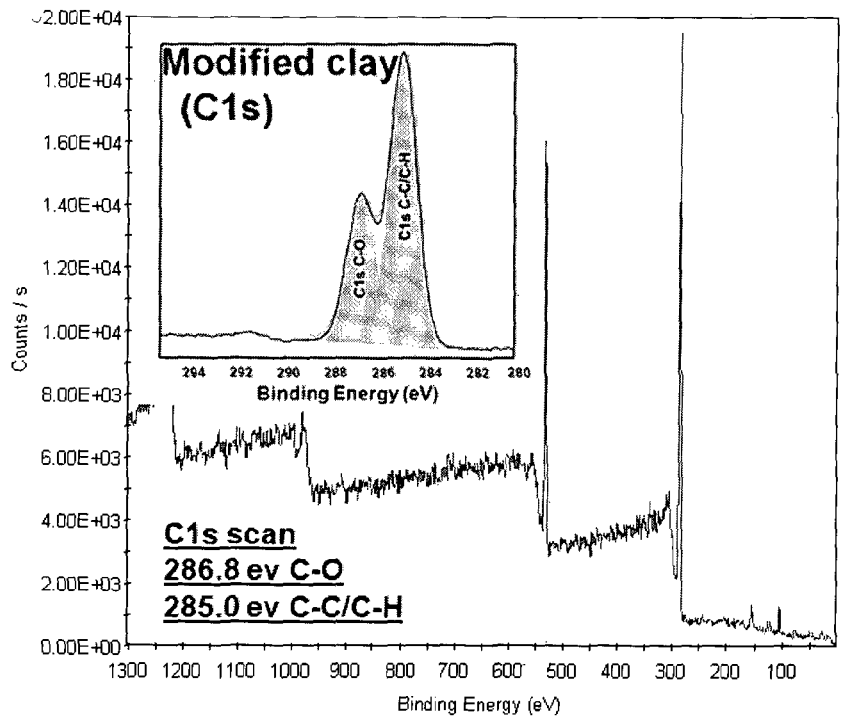
Figure 22:
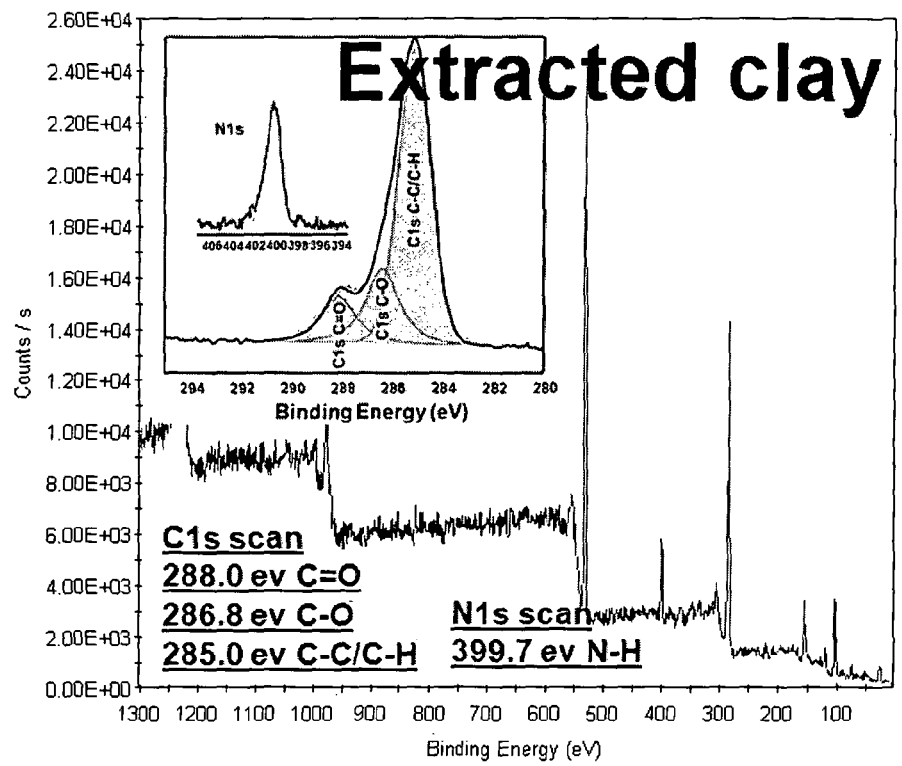

FIG. 22A to 22C are X-ray photoelectron spectroscopy (XPS) spectra of extracted clay, modified clay and pristine clay. Y-axis: counts (/s); x-axis: Binding Energy (eV). Results indicate intercalation of clay with epoxy, and that there is covalent bonding formed during melt blending. About 15 wt % of PA6 is bonded with clay extracted from composites.

Figure 23:
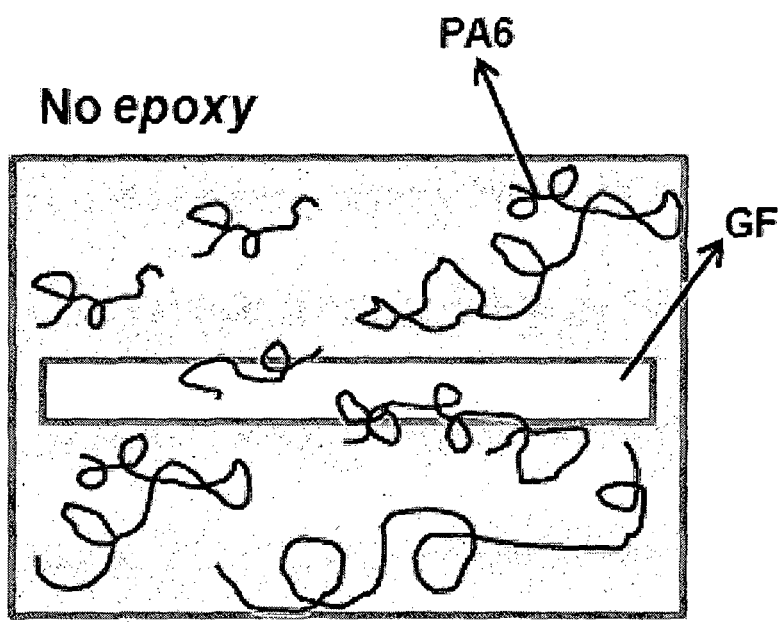
Figure 23:
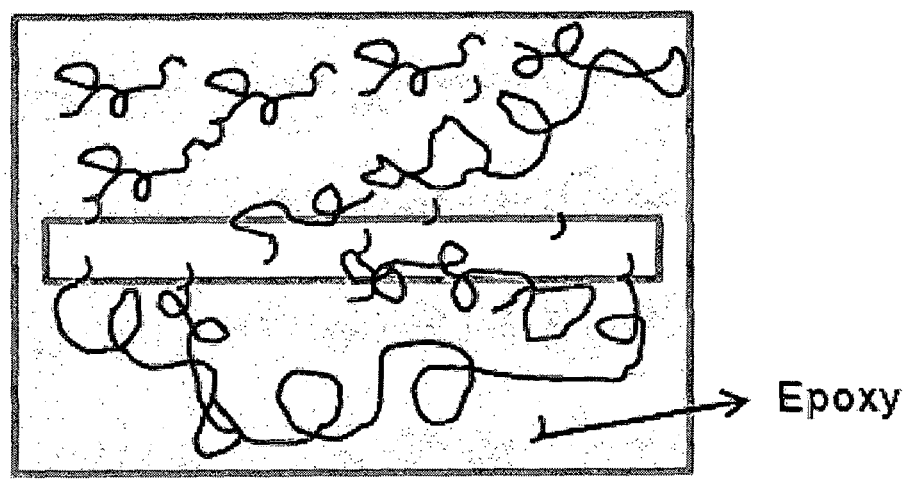

FIG. 23 is a schematic diagram depicting proposed principle for mechanical property enhancement (A) GF with no epoxy; and (B) GF with epoxy. Without wishing to be bound by theory, it is postulated that epoxy promoted the interfacial bonding between GF and polyamide 6, which results in improvement in strength and toughness.

Figure 24:
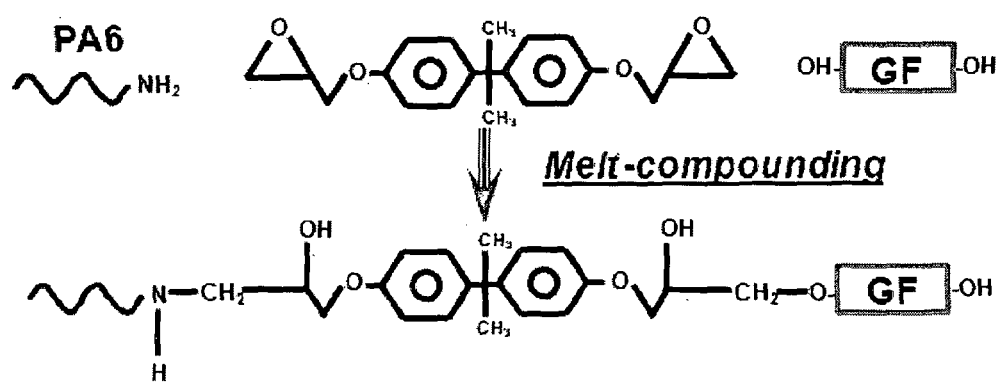

FIG. 24 depicts possible chemical reaction between PA6, clay and glass fiber that takes place during melt-compounding according to an embodiment.

DETAILED DESCRIPTION

By modifying clay platelets through intercalating interlayer gaps of the clay platelets with a binder, fiber-reinforced polymer composites comprising the modified clay platelets with improved mechanical properties may be obtained. For example, improvements in Young's modulus, tensile strength, ductility, impact strength (Notch Izod) and flexural modules of 31%, 14%, 19%, 23% and 11% respectively, have been achieved. The clay platelets may be chemically modified with silane prior to intercalation with the binder. Subsequent melt-compounding of the modified clay platelets with fiber-reinforced polymers produces a ternary polymer/fiber/clay composite. The improved mechanical properties may arise due to interfacial interaction of polymer/fiber and polymer/clay with the binder, as well as further intercalation of the clay material with polyamide.

Accordingly, in a first aspect, the invention refers to a method of preparing a fiber-reinforced polymer composite. As used herein, the term "fiber-reinforced polymer composite" refers generally to a mixture of materials, whereby a fibrous component is dispersed in a matrix formed by a polymeric component.

The fibrous component comprises a plurality of fibers. The term "fibers" as used herein refers to a class of materials, which may be natural or synthetic, that are in discrete elongated pieces. The fibers may be produced by conventional, techniques such as electrospinning, interfacial polymerization, and the like. The fibers may be used as a component of polymer composite materials to reinforce mechanical properties of the composites. In use, the fibers may be incorporated in the composites via cross-linking, gluing, weaving, braiding, knitting, knotting, or molding during the composites manufacturing process.

Examples of fibers include, but are not limited to, glass fibers, carbon and graphite fibers, polymer fibers, metal fibers, silicon carbide fibers, cellulose fibers, and mixtures thereof. Examples of polymer fibers include, but are not limited to, fibers formed of unsaturated polyesters, epoxies, phenolics, and polyimides, to name only a few. In various embodiments, the fibers in the fiber-reinforced polymer composite comprise or consist of glass.

Generally, any polymeric material may be used to form the fiber-reinforced polymer composite. The polymeric material may be a thermosetting polymer such as polyurethane, or a thermoplastic polymer such as polyamide. In various embodiments, the polymer comprises or consists of a thermoplastic polymer. In specific embodiments, the polymer comprises or consists of polyamide.

The method includes providing a swollen clay material. As used herein, the term "clay material" refers generally to mineral clays, synthetic clays, organoclays, and mixtures thereof. The clay material may comprise or consist of silicates with a layered or platelet structure, with thickness of the layered or platelet structure in the nanometers range. A swollen clay material is formed when a clay material is exposed to an aqueous medium such as water, whereby the aqueous medium diffuses into the clay material between the layers, causing the layers to move apart. This results in expansion or swelling of the clay material, where the layers are not as strongly held together.

Phyllosilicates belong to the class of layered silicates, and refer generally to silicates in which the $SiO_4$ tetrahedra have been bonded in infinite two-dimensional networks. The layers of silicates may be held together by electrochemical attraction such as via the cations lying between them, and the cations mostly present in the phyllosilicates which occur naturally are Na, K, Mg, Al, and/or Ca.

Examples of phyllosilicates, which may be synthetic or naturally occurring, include montmorillonite, sepiolite, smectite, illite, palygorskite, muscovite, allevardite, amesite, hectorite, saponite, fluorohectorite, beidellite, talc, nontronite, vermiculite, stevensite, bentonite, mica, fluorovermiculite, halloysite, and fluorine-containing synthetic varieties of talc. In various embodiments, the swollen clay material comprises montmorillonite.

Providing a swollen clay material may include dispersing and swelling a clay material in an aqueous medium. As mentioned above, when a clay material is exposed to an aqueous medium such as water, the aqueous medium diffuses into the clay material between the layers, which cause the layers to move apart. This results in expansion or swelling of the clay material, where the layers are not as strongly held together. When the clay material is subject to drying conditions, the water between the layers escapes and evaporates, and the clay material shrinks.

In embodiments where pristine montmorillonite is used, the pristine montmorillonite is hydrophilic and may be dispersed in an aqueous medium such as water to form a stable suspension under homogenization. The montmorillonite clay may be dispersed as isolated sheets or small domains of a plurality of sheets. At the same time, the montmorillonite clay takes up water to form a swollen clay material.

Examples of aqueous medium that may be used to swell the clay material include, but are not limited to, water, buffer solution, acid, or a salt solution. In various embodiments, the aqueous medium contains an acid. For example, the aqueous medium may comprise acetic acid. Advantageously, it has been found by the inventors that a slightly acidic solution, which may be obtained by adding a few drops of acetic acid into the aqueous medium, helps to disperse and stabilize clay material in the aqueous medium.

The method of the first aspect includes chemically modifying a surface of the swollen clay material with an organosilane to form a silane-modified clay material.

Silanization of the swollen clay material is carried out to improve interfacial interaction between clay and the polymer. Advantageously, hydrophobic silane molecules, which are chemically-bonded to the clay platelets' surfaces, ensure good compatibility between the hydrophilic clay platelets and the hydrophobic polymer matrix. In addition, cracking of intercalated clay chemically bonded to the polymer matrix under external stress enhances the impact strength of the polyamide/glass-fiber/clay ternary composites.

The silanization process may take place for any suitable length of time. In various embodiments, chemically modifying a surface of the swollen clay material with an organosilane to form a silane-modified material is carried out for a few hours, such as about 3 hours to about 24 hours. Advantageously, the reaction condition used is mild and may take place under stirring at room temperature.

Examples of organosilanes that may be used include, but are not limited to, (3-glycidoxypropyl)trimethoxy silane, N-2-(aminoethyl)-3-aminopropyltrimethoxy silane, gamma-aminopropyltriethoxy silane, N-beta-(aminoethyl)-gamma-aminopropyltrimethoxy silane, aminoethyl-N-beta-(aminoethyl)-gamma-aminopropyl-trimethoxy silane, gamma-ureidopropyl-triethoxy silane, beta-(3-4 epoxy-cyclohexytyethyl-trimethoxy silane, gamma-glycidoxypropyltrimethoxy silane, and vinyltrichloro silane, to name a few. In various embodiments, the organosilane comprises or consists of (3-glycidoxypropyl)trimethoxy silane.

Chemically modifying a surface of the swollen clay material with an organosilane may be carried out in an organic solvent such as alcohol, acetone, and dimethylformamide (DMF). In various embodiments, chemically modifying a surface of the swollen clay material with an organosilane is carried out in acetone.

The stable dispersion state of swollen clay material in the aqueous medium is able to extend to dispersion of the swollen clay material in the organic solvent, such as acetone, by exchange of water with the organic solvent. In various embodiments, water is added to disperse and to further swell the silane-modified clay material.

The method of the first aspect includes intercalating the silane-modified clay material with a binder to form an intercalated clay material. As used herein, the term "binder" refers to a material that is able to bind or hold the components in the fiber-reinforced polymer composite together. Examples of binder include, but are not limited to, epoxy resins, polyvinyl butyral resins, polyvinyl formal resins, silicone resins, polyamide resins, polyester resins, polystyrene resins, polycarbonate resins, polyvinyl acetate resins, polyurethane resins, and phenoxy resins.

In various embodiments, the binder comprises or consists of an epoxy resin. For example, the epoxy resins may include curable epoxy resins having one or more epoxy groups per molecule. Advantageously, the epoxy molecules provide chemical bonding between the clay platelets' surfaces and the polymer matrix as well as between fibers and polymer matrix during subsequent melt-compounding, thus ensuring high composite strength and stiffness.

Examples of epoxy resins include, but are not limited to, glycidyl ether type epoxy resins such as epoxy resins derived from polyfunctional hydroxyl group-containing compounds such as bisphenol A, brominated bisphenol A, bisphenol F, tetrahydroxy-phenylethane, resorcinol, novolaks, polyalkylene glycols and glycerin and epihalohydrins; glycidyl ester type epoxy resins such as glycidyl phthalate, glycidyl hexahydrophthalate and glycidyl esters of dimer acids; glycidyl amines such as triglycidyl isocyanurate and tetraglycidyldiaminodiphenyl-methane; alicyclic epoxy resins such as 3,4-epoxy-6-methylcyclohexylmethyl-3,4-epoxy-6-methylcyclohexane carboxylate, vinylcyclohexene diepoxide, dicyclopentadiene oxide and bis(2,3-epoxycyclopentyl)ether; and combinations thereof.

The binder may penetrate into the inter-layer gaps of the clay material, and be retained within the clay material. In various embodiments, the intercalation is carried out in a suitable organic solvent such as acetone.

The method of the first aspect may further comprise drying the intercalated clay material prior to melt-compounding. During this time, the intercalated clay material remains in a swollen state due to water that has been taken up in the clay material. In various embodiments, drying the intercalated clay material is carried out by spray drying or freeze drying.

The method of the first aspect includes melt compounding the intercalated clay material with a mixture comprising a polymer and fiber to form the fiber-reinforced polymer composite. In various embodiments, melt compounding the intercalated material is carried out at a temperature in the range of 200° C. to 300° C., such as in the range of 220° C. to 300° C., 240° C. to 300° C., 260° C. to 300° C., 200° C. to 280° C., 200° C. to 260° C., 200° C. to 240° C., 220° C. to 280° C., 240° C. to 260° C., or about 250° C. to about 255° C.

Melt compounding the intercalated clay with a mixture comprising a polymer and fiber may be carried out in a twin screw extruder. Generally, a twin screw extruder includes two intermeshing, co-rotating screws mounted on splined shafts in a closed barrel. Depending on the processing requirements, various screw profiles and process functions may be set up by modifying the screw and barrel design.

Content of clay in the ternary composite may be controlled by adjusting feed rate ratio of polymer/glass fiber composite and clay material at different feeding ports of the twin screw extruder. Alternatively, the clay material may be pre-mixed with the polymer/glass fiber composite before feeding to the twin screw extruder.

Twin-screw extruders with stronger mixing effect are more suited to produce composites with good mechanical properties due to improved dispersion of fillers in the polymer matrix. In embodiments where glass fibers are used however, the glass fibers tend to be shortened, resulting in significant decrease in mechanical performance. To avoid this situation, a good balance between dispersion of clay and retaining of length of glass fibers is important.

In various embodiments, length-to-diameter ratio of the twin screw extruder is in the range of about 25 to about 27, such as 25, 26 or 27. The screw rotation of the twin screw extruder may be in the range of about 100 to about 200, such as about 100 to about 180, about 100 to about 160, about 100 to about 140, about 120 to about 200, about 140 to about 200, about 160 to about 200, about 120 to about 180, about 140 to about 160, about 200, about 150 or about 100.

In a second aspect, the invention relates to a fiber-reinforced polymer composite prepared by a method according to the first aspect. In a further aspect, the invention relates to a fiber-reinforced polymer composite comprising a silane-modified clay material that is intercalated with a binder.

Examples of polymer and fibers that may be used to form the fiber-reinforced polymer composite have already been discussed above. In various embodiments, the polymer in the fiber-reinforced polymer composite comprises or consists of polyamide. In various embodiments, the fiber in the fiber-reinforced polymer composite comprises or consists of glass.

The amount of fiber in the fiber-reinforced polymer composite may be in the range of about 10 wt % to about 20 wt %, such as about 10 wt % to about 18 wt %, about 10 wt % to about 16 wt %, about 10 wt % to about 14 wt %, about 10 wt % to about 12 wt %, about 12 wt % to about 20 wt %, about 14 wt % to about 20 wt %, about 16 wt % to about 20 wt %, about 12 wt % to about 18 wt %, or about 14 wt % to about 16 wt %.

In various embodiments, the clay in the silane-modified clay material comprises or consists of montmorillonite clay. The amount of clay in the fiber-reinforced polymer composite may be up to 5 wt %, or in the range of about 1 wt % to about 5 wt %, such as about 1 wt % to about 4 wt %, about 1 wt % to about 3 wt %, about 1 wt % to about 2 wt %, about 2 wt % to about 5 wt %, about 3 wt % to about 5 wt %, about 4 wt % to about 5 wt %, or about 2 wt % to about 4 wt %.

The amount of silane in the silane-modified clay material may be in the range of about 1 wt % to about 25 wt % of clay, such as about 1 wt % to about 20 wt %, about 1 wt % to about 15 wt %, about 1 wt % to about 10 wt %, about 1 wt % to about 5 wt %, about 5 wt % to about 25 wt %, about 10 wt % to about 25 wt %, about 15 wt % to about 25 wt %, about 20 wt % to about 25 wt %, about 5 wt % to about 20 wt %, about 10 wt % to about 20 wt %, or about 10 wt % to about 15 wt %.

In various embodiments, the binder comprises or consists of an epoxy resin. The amount of binder in the silane-modified clay material may be in the range of about 30 wt % to about 90 wt % of clay, such as about 40 wt % to about 90 wt %, about 50 wt % to about 90 wt %, about 60 wt % to about 90 wt %, about 70 wt % to about 90 wt %, about 80 wt % to about 90 wt %, about 30 wt % to about 80 wt %, about 30 wt % to about 70 wt %, about 30 wt % to about 60 wt %, about 30 wt % to about 50 wt %, about 30 wt % to about 40 wt %, about 50 wt % to about 80 wt %, or about 40 wt % to about 60 wt %.

As disclosed herein, strength, modulus and impact resistance of fiber-reinforced polymer composites are enhanced simultaneously by incorporating a surface-modified clay material. In various embodiments, the clay material is modified by chemically bonding an organosilane onto platelets of the clay material, and intercalating binder molecules such as epoxy molecules between the platelets of the clay material. In so doing, the polymer matrix is both intercalated and chemically bonded to the clay filler in the resulting polymer composites. Polymer/fiber/clay ternary composites possessing high strength, modulus and impact resistance, and which may be melt-processed using conventional thermoplastic processing and manufacturing technology are formed.

The organosilane, which act as surface modifier, is chemically bonded to surfaces of the clay platelets. This allows formation of chemical bonds between the clay platelets and polymer matrix during melt-compounding, which compares favorably to conventional organoclay platelets which are surface-modified via electrostatic interaction only. Further, the binder molecules allow formation of chemical bonds between fibers and polymer matrix during melt-compounding, as well as between clay platelets and the polymer matrix.

Besides improves in mechanical properties, the developed polyamide/glass-fiber/clay ternary composite according to various embodiments also exhibits improved stability against thermal oxidation. In embodiments where secondary elastomers or polymers are not used in preparing the ternary composite, this avoids losses in strength and stiffness in the ternary composite thus formed.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1

Clay Modification 5.5 g of dry clay powder (Pristine MMT clay) is dispersed and swelled in 150 ml of deionised (DI) water for a few hours under stirring. 0.2 ml of acetic acid is then added to the suspension, after which the suspension is stirred for another 30 minutes, sonicated for 30 minutes in an ultrasonic water-bath and stirred again for 12 hrs.

Pristine MMT clay is hydrophilic and may be dispersed into water to form a stable suspension under homogenization, in which clay is dispersed as isolated sheets or small domains consisting of a few sheets. A slightly acidic adjustment of the suspension by adding drops of acetic acid may help to disperse and stabilize the clay sheets.

This stable dispersion state of clay in water may be transferred to clay/acetone slurry through exchanging water with acetone, and the exchanging process includes pouring the water suspension into acetone followed by homogenizing for a while, filtering off the mixed water/acetone solvent followed by washing with acetone, and re-dispersing the obtained slurry into acetone under homogenization for a while.

Accordingly, the aqueous clay suspension is homogenized by a high-speed shear homogenizer for 15 minutes, poured into 700 ml of acetone under homogenization, and further homogenized again for 5 minutes. Next, the resulting acetone/water clay suspension is filtered and the gelatinous clay residue is re-dispersed in 700 ml of acetone. The acetone-clay suspension is then homogenized again for 5 minutes and filtered.

To improve the interfacial interaction between clay sheets and polyamide, glycidoxy functional group is introduced onto the surface of clay sheets by adding (3-glycidoxypropyl)trimethoxysilane into the obtained clay/acetone slurry.

This is carried out by redispersing the final gelatinous clay residue obtained in 400 ml of acetone, to which 0.26 ml of (3-glycidyloxypropyl)trimethoxy silane is added. This suspension is then stirred for 12 hrs at room temperature, sonicated for 30 minutes in an ultrasonic water-bath and stirred again for 24 hrs at 53° C.

Following that, excess acetone is removed from the acetone-clay suspension by stirring the suspension at mild heating at 73° C. until 200 g of clay suspension is obtained. 90 g of DI water is then added to the suspension, which is left to stir again for 2 hr. This is carried out in order to disperse and swell the silane-modified clay sheets. After that, a solution containing 3.96 g of epoxy in 10 g of acetone is added to the aqueous/acetone clay suspension. The suspension is then homogenized for 1 hr.

Subsequently, acetone and water are removed from the homogenized suspension by rotary evaporation until 100 ml of aqueous clay suspension remains. The epoxy resin molecules can gradually penetrate into the inter-layer gaps of clay sheets and be retained inside during the evaporating of acetone.

As water existing in the clay slurry, the clay sheets intercalated by epoxy resin remain swelled morphology and the clay suspension is frozen at −20° C. for 24 hrs, and then at −80° C. for another 24 hrs. The frozen clay suspension is freeze-dried for 3 days. The solid residue obtained is then further dried in a vacuum oven at 60° C. for a few days. Although freeze drying has been used, the surface-modified clay may also be achieved through spray-drying.

Example 2

Melt-compounding of Modified Clay with Polyamide 6 and Glass Fiber

Polyamide/glass-fiber/clay ternary composite with the desired filler loading is fabricated by melt-compounding a fixed amount of dried exfoliated surface-modified clay powder with polyamide/glass-fiber composite pellets in a twin-screw extruder. The resulting polyamide/glass-fiber/clay ternary composite material is then chopped into pellets for subsequent processing and use.

The content of clay in ternary composite may be controlled by adjusting the feeding rate ratio of polyamide/glass-fiber pellets and clay that are fed at different feeding ports. Alternatively, clay of desired amount may be pre-mixed with polyamide/glass-fiber pellets and fed together. Both methods are equally effective and applicable based on experiments that have been carried out.

Twin-screw extruder with a stronger mixing effect is more suitable to obtain nanocomposite with excellent mechanical properties due to better disperse of nanofillers in polymer matrix. However, glass-fibers are shortened further using such melt-compounding techniques, leading to significant decrease of mechanical performance. Therefore, a good balance between disperse of nanoclay and retain of length of glass-fiber is important.

In view of the above, a Eurolab 16 Twin Screw Extruder (Thermo Scientific) with L/D=25 and D=16 mm, screws consisting 3 mixing zones was used to produce all composites mentioned.

As an example, polyamide/glass-fiber composite and polyimide/glass-fiber/clay ternary composites containing 2, 3, 4 and 5% of clay by weight, hereby named PGCE, PGCE2, PGCE3, PGCE4 and PGCE5 respectively, were prepared via melt-compounding in a twin-screw extruder (L/D=25; D=16 mm) (Eurolab 16 Twin Screw Extruder, Thermo Scientific) at a screw speed of 200 rpm. Polyamide/glass-fiber composite pellets are completely dried in vacuum oven at 80° C. overnight before compounding with modified clay powder. The screws consisted of 2 mixing zones with 12 compounding elements in each zone. The temperatures employed along the barrel during extrusion from the inlet to the die were 250, 250, 250, 255, 255 and 255° C. The extruded composites were air-cooled and pelletized.

Composite films were prepared from the extruded pellets of each sample by hot-pressing them at 220° C. for 10 mins under a pressure of 60 bars using a laboratory press (P 200E, Dr Collin GmbH).

The following characterization studies were done on the above samples and the results obtained are discussed in the following section.

Example 3

Mechanical Testing and Characterization

To evaluate the comprehensive mechanical properties of ternary composites, standard tensile test, 3-point bending test and single-edge Izod impact test are conducted following ASTM procedures.

Tensile testing of composites obtained was conducted on the standard tensile test bars at a crosshead speed of 2 mm/min using a 10 kN load cell in a Instron Universal Tester 5569. 3-Point bending (flexural) testing of composites obtained was conducted on the standard rectangular test bars at a crosshead speed of 13.65 mm/min using a 10 kN load cell in a Instron Universal Tester 5569. Izod impact testing was conducted on the standard single-edge notch impact test bars in a Zwick Roell Pendulum impact testor HIT25P.

Composite pellets were dried overnight at 80° C. in a vacuum oven and injection molded into tensile, flexural and impact test bars using an injection molding machine (Haake Mini Jet II, Thermo Scientific). Temperature of the cylinder was set at 280° C. and the composite melts were injected at 600 bars in 20 s into a 120° C. mold and a post injection pressure of 300 bars was maintained for 10 s.

TEM observation of thin sections of the composites was performed with a JEOL 2100 TEM under an acceleration voltage of 200 kV. Thin sections with thickness of about 50 nm of the composite film were cut from the prepared composite test bars under cryogenic conditions using a Leica ultramicrotome equipped with a diamond knife. SEM image of the cross-section of composite test bars was examined using a field emission scanning electron microscope (SEM, JEOL JSM-6700F).

Composite sheets were prepared from the extruded pellets of each polyamide reinforced with modified clay and glass fiber binary filler by hot-pressing at 220° C. for 10 mins under a pressure of 60 bars using a laboratory press (P 200E, Dr Collin GmbH). Hot-pressed composite sheets were mounted onto a sample holder with double-sided sticky tape prior to XRD analysis. Diffraction angle (2θ) of each sample was measured from 2.5 to 30° using a X-ray diffractometer (D8 GADDS XRD, Bruker) at 40 kV and 40 mA with Cu—Kα radiation as the X-ray source and data acquisition time of 10 minutes per sample.

Table 1 is a summary of the tensile properties of glass fiber-reinforced Polyamide 6 and Polyamide 6/glass-fiber/clay ternary composite (clay: 2-5 wt %, glass fiber: 15 wt %). Crosshead rate for tensile test is 2 mm/min.

TABLE 1

| Polyamide 6 composites | Young's Modulus (GPa) | Tensile strength (MPa) | Failure strain (%) | Strain energy at failure (MJ/m$^3$) |
|---|---|---|---|---|
| PA6/GF (85-15) | 4.04 ± 0.12 | 84.4 ± 0.68 | 13.8 ± 1.07 | 10.6 ± 0.69 |
| PA6/GF/clay (83-15-2) | 5.10 ± 0.30 | 86.0 ± 0.62 | 13.7 ± 1.20 | 11.0 ± 1.26 |
| PA6/GF/clay (82-15-3) | 5.23 ± 0.18 | 96.5 ± 1.66 | 16.4 ± 1.43 | 14.8 ± 1.33 |
| PA6/GF/clay (81-15-4) | 5.23 ± 0.11 | 96.2 ± 2.00 | 17.3 ± 1.78 | 14.2 ± 1.47 |
| PA6/GF/clay (80-15-5) | 5.67 ± 0.15 | 105 ± 2.51 | 13.9 ± 1.06 | 13.2 ± 1.20 |

Table 2 summarizes flexural properties of glass fiber-reinforced Polyamide 6 and Polyamide 6/glass-fiber/clay ternary composite (clay: 2-5 wt %, glass fiber: 15 wt %). Crosshead rate for 3-point bending test is 13.65 mm/min.

TABLE 2

| Polyamide 6 composites | Flexural Modulus (GPa) |
|---|---|
| PA6/GF (85-15) | 4.24 ± 0.11 |
| PA6/GF/clay (83-15-2) | 4.59 ± 0.05 |
| PA6/GF/clay (82-15-3) | 4.72 ± 0.08 |
| PA6/GF/clay (81-15-4) | 4.65 ± 0.10 |
| PA6/GF/clay (80-15-5) | 4.76 ± 0.11 |

Table 3 summarizes Izod impact properties of glass fiber-reinforced Polyamide 6 and Polyamide 6/glass-fiber/clay ternary composite (clay: 2-5 wt %, glass fiber: 15 wt %).

| Polyamide 6 composites | Impact strength (KJ/m$^2$) |
|---|---|
| PA6/GF (85-15) | 4.93 ± 0.75 |
| PA6/GF/clay (83-15-2) | 6.43 ± 1.70 |
| PA6/GF/clay (82-15-3) | 5.71 ± 1.47 |
| PA6/GF/clay (81-15-4) | 5.64 ± 1.57 |
| PA6/GF/clay (80-15-5) | 4.47 ± 1.56 |

Example 4

Discussion

At high temperatures during melt-compounding, the glycidyl group on silane and epoxy molecules reacts with the —NH$_2$ or —COOH groups on polyamide to form chemical bonds. The resulting ternary composite contains well-dispersed clay platelets that are uniformly and randomly distributed among, and chemically bound to, the polymer matrix as well as the glass fibers. Glass fibers and clay platelets impart high strength and modulus to the ternary composite, while uniform distribution, large interfacial area, strong interfacial interaction and chemical adhesion between clay platelets and composite matrix as well as chemical bonding among clay platelets confer high impact resistance by impeding propagation of cracks through the material. The ternary composite material may then be processed into articles using conventional thermoplastic processing and manufacturing technology.

Figure 1:
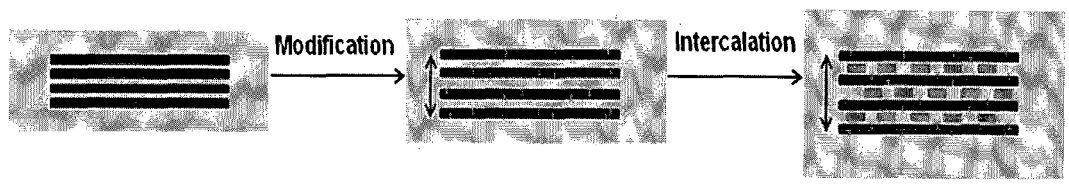
FIG. 1A is a schematic diagram depicting fabrication of clay through chemical modification by silane and intercalation by epoxy resin according to an embodiment. In the example shown, montmorillonite (MMT) clay sheets are chemically modified with silane, and interstitial gaps between clay sheets are filled up with epoxy resin, resulting in production of a surface-modified intercalated clay nanopowder.
FIG. 1B is a schematic diagram depicting structure of a polyamide composite reinforced with modified clay and glass fiber binary filler according to an embodiment. In the embodiment shown, the surface-modified intercalated clay nanopowder nanopowder is melt-compounded with polyamide/glass-fiber composite pellets in a twin-screw extruder to produce polyamide/glass-fiber/clay ternary composite.
FIG. 1C is a schematic diagram depicting intercalation of clay by both epoxy and polyamide 6 (PA6) according to an embodiment. The interfacial interaction of polyamide/glass-fiber and polyamide/clay are both improved by epoxy resin. At the same time, the clay sheets are further intercalated by polyamide. Covalent bonds are formed during melt blending, and strength and toughness are therefore improved.
Figure 1:
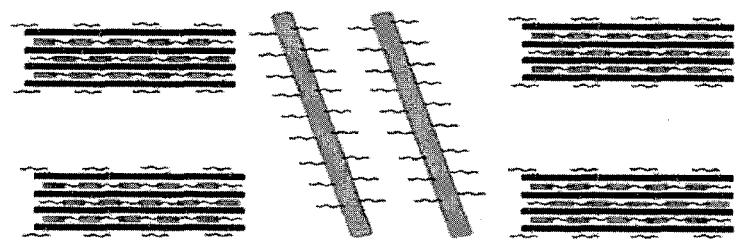
Figure 1:
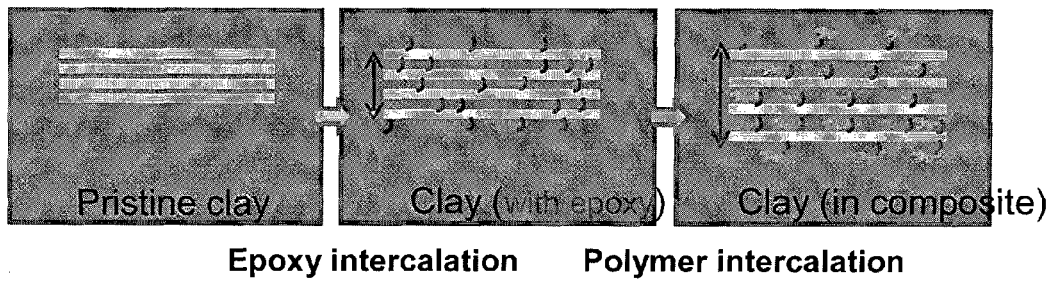
Figure 2:
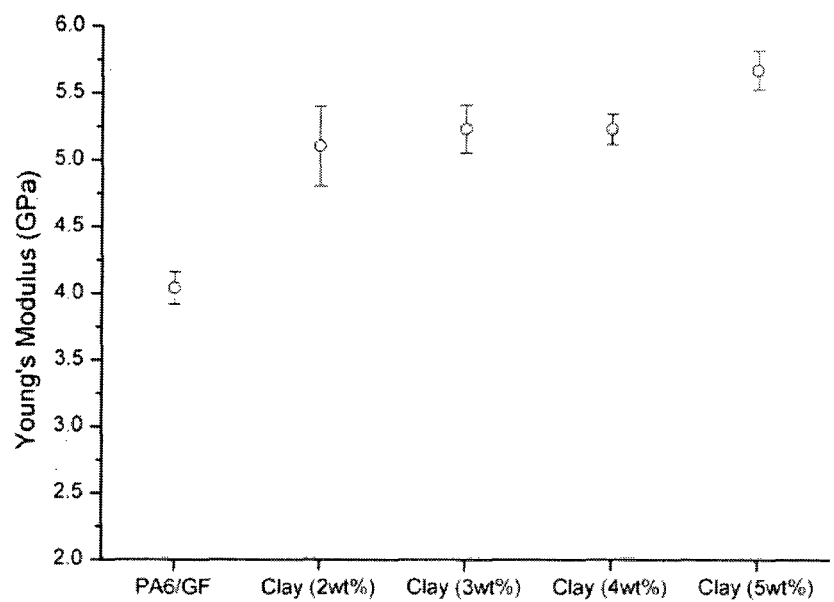
Figure 2:
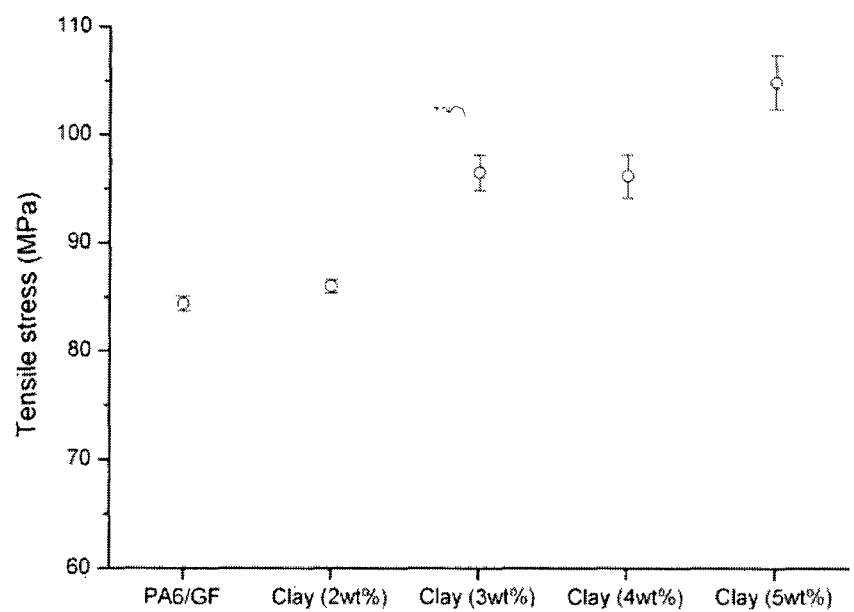
Figure 2:
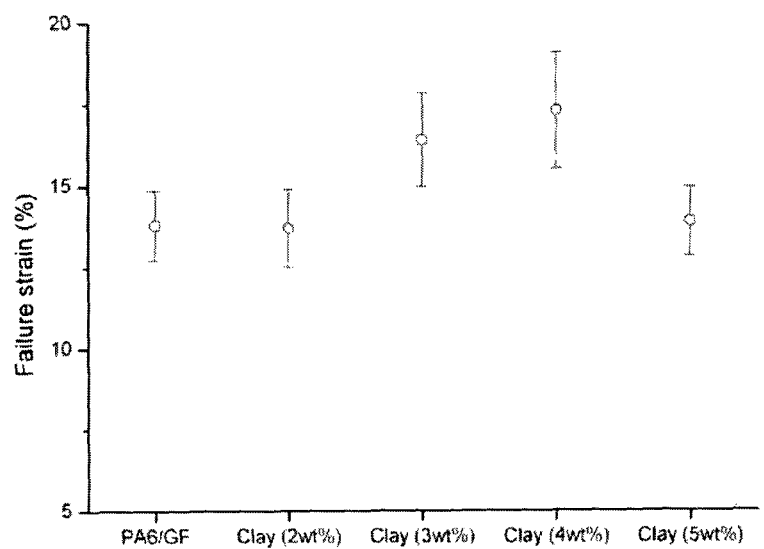
Figure 2:
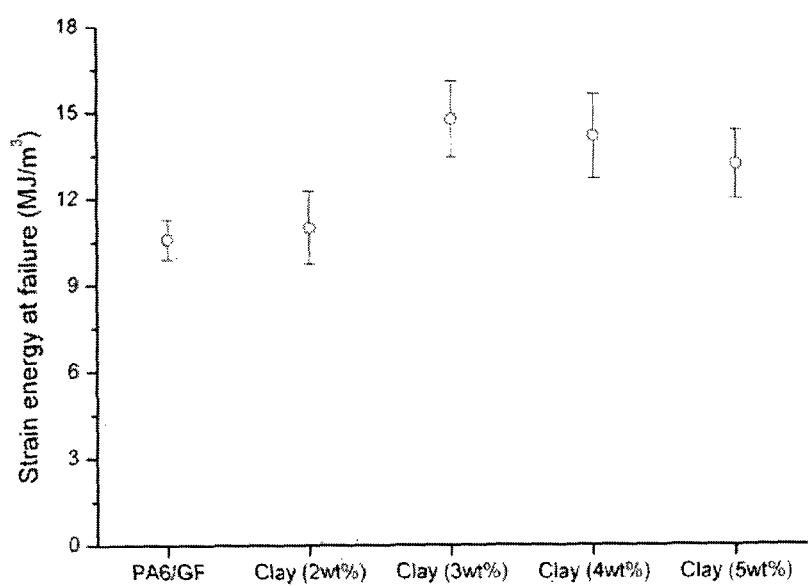
Figure 3:
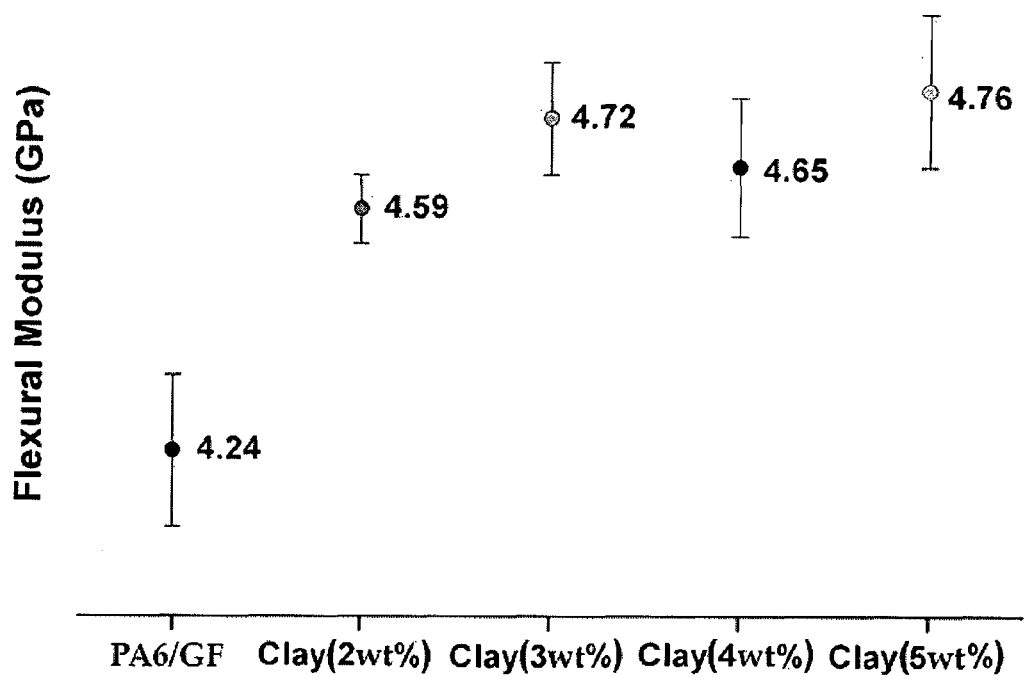
FIG. 3 is a graph showing flexural properties of polyamide 6/glass-fiber/clay ternary composite at different clay content of i) 0 wt %; ii) 2 wt %; iii) 3 wt %; iv) 4 wt %; and v) 5 wt % clay. Flexural modulus under bending condition represents the stiffness of materials. Results indicated that there is an increase in flexural modulus of up to 12% compared to neat PA6/Glass Fiber, and introduction of modified clay increases the stiffness of PA6/GF.
Figure 4:
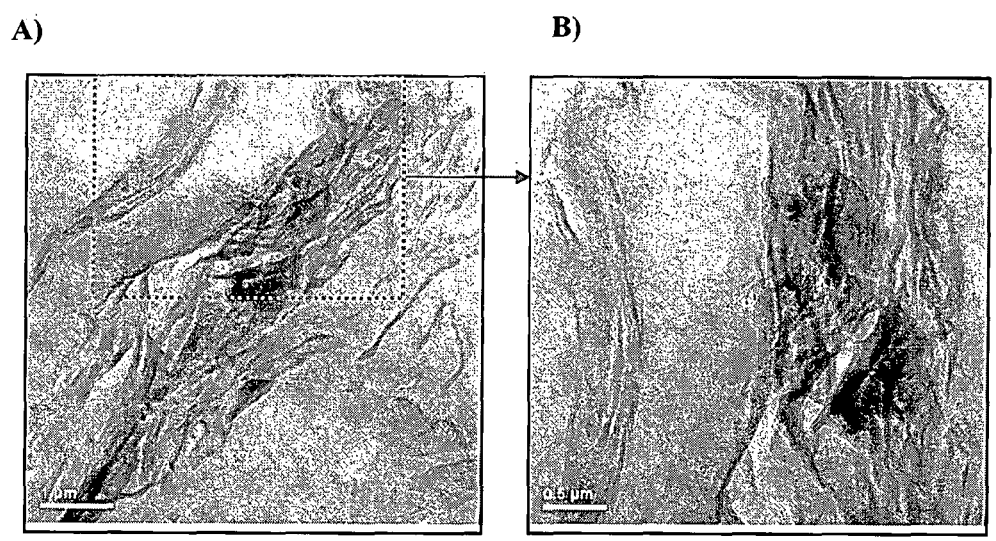
FIGS. 4A and 4B are transmission electron microscopy (TEM) images of Polyamide 6/glass-fiber/clay ternary composite. (clay: 3 wt %, glass fiber: 15 wt %).

Significant increase of Young's modulus, tensile strength (maximum stress before failure), tensile ductility (elongation at break) and strain energy absorbed at failure may be observed, as shown in FIG. 2A to 2D. The maximum increment of above properties can reach as high as 31%, 24%, 26% and 39%, respectively. In terms of flexural modulus (obtained from bending test), a maximum increase of 12.4% can also be found, as shown in FIG. 3.

Addition of presently modified clay in the polyamide/glass-fiber composite does not result in a drop of impact strength of composite. Ternary composites in this invention show an unique increase of impact strength up to 30% compared to neat polyamide/glass-fiber composite without clay, as shown in Table 3. Combining all example data, listed in Tables 1 to 3, polyamide/glass-fiber/clay ternary composite presents excellent comprehensive mechanical properties. In particular, simultaneous reinforcing and toughening effect may be realized by adding a few percentages of modified clay.

In the embodiments shown, by way of example only, polyamide/glass-fiber/clay ternary composites have been fabricated by melt-compounding polyamide/glass-fiber composite pellets with clay that has been surface-modified with silane and epoxy, or polyamide, glass-fibers and the surface-modified clay. The use of appropriately-modified clay in the ternary composites allows for simultaneous enhancement of the strength, stiffness and impact resistance of short glass-fiber-reinforced polymer composites. Good interfacial interactions between clay platelets and polymer matrix, and between glass-fibers and polymer matrix, may be achieved via the use of silane and epoxy as surface modifiers.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a fiber-reinforced polymer composite, the method comprising
    a) providing a swollen clay material comprising a clay material and an aqueous medium dispersed between layers of the clay material;
    b) chemically modifying a surface of the swollen clay material with an organosilane to form a silane-modified clay material;
    c) intercalating the silane-modified clay material with a binder to form an intercalated clay material; and
    d) melt compounding the intercalated clay material with a mixture comprising a polyamide polymer and discrete, elongated pieces of fiber, thereby dispersing the intercalated clay material along with the fiber in the polyamide polymer, to form the fiber-reinforced polymer composite.

2. The method according to claim 1, wherein providing a swollen clay material comprises dispersing and swelling a clay material in an aqueous medium comprising acetic acid.

3. The method according to claim 1, wherein the swollen clay material comprises montmorillonite clay.

4. The method according to claim 1, wherein chemically modifying a surface of the swollen clay material with an organosilane is carried out in acetone.

5. The method according to claim 1, wherein the organosilane comprises (3-glycidyloxypropyl)trimethoxy silane.

6. The method according to claim 1, wherein the binder comprises an epoxy resin.

7. The method according to claim 1, further comprising drying the intercalated clay material before melt compounding operation d), wherein the drying is carried out by spray drying or freeze drying.

8. The method according to claim 1, wherein melt compounding the intercalated clay material is carried out at a temperature in the range of 200° C. To 300° C.

9. The method according to claim 1, wherein melt compounding the intercalated clay material is carried out in a twin screw extruder.

10. The method according to claim 9, wherein length-to-diameter ratio of the twin screw extruder is in the range of about 25 to about 27.

11. The method according to claim 9, wherein screw rotation of the twin screw extruder is in the range of about 100 revolutions per minute to about 200 revolutions per minute.

12. The method according to claim 1, wherein the fiber comprises glass.

* * * * *